US011973810B2

(12) United States Patent
Bailey et al.

(10) Patent No.: US 11,973,810 B2
(45) Date of Patent: Apr. 30, 2024

(54) DATA SHARING CONTROL METHODS AND SYSTEMS

(71) Applicant: Intergraph Corporation, Madison, AL (US)

(72) Inventors: Mark Bailey, Huntsville, AL (US); Phillip Barrett, Owens Cross Roads, AL (US); Joshua Beard, Huntsville, AL (US); Jeremy Leshko, Huntsville, AL (US); Jared Phillips, Harvest, AL (US); Lawrence C. Levert, IV, Madison, AL (US)

(73) Assignee: Intergraph Corporation, Madison, AL (US)

( * ) Notice: Subject to any disclaimer, the term of this patent is extended or adjusted under 35 U.S.C. 154(b) by 0 days.

(21) Appl. No.: 16/895,610

(22) Filed: Jun. 8, 2020

(65) Prior Publication Data
US 2020/0389505 A1 Dec. 10, 2020

Related U.S. Application Data

(60) Provisional application No. 62/858,447, filed on Jun. 7, 2019.

(51) Int. Cl.
*G06F 15/16* (2006.01)
*G06F 21/60* (2013.01)
(Continued)

(52) U.S. Cl.
CPC .......... *H04L 65/40* (2013.01); *H04L 67/1097* (2013.01)

(58) Field of Classification Search
CPC ..... H04L 65/40; H04L 67/1097; H04L 63/10; H04L 67/10; H04W 4/00
(Continued)

(56) References Cited

U.S. PATENT DOCUMENTS 5,353,023 A * 10/1994 Mitsugi .................. G01C 21/20 340/436
8,024,330 B1 * 9/2011 Franco .................... G06F 16/00 707/724

(Continued)

FOREIGN PATENT DOCUMENTS

EP 2 116 954 A1 11/2009
WO 2019052751 A1 3/2019

OTHER PUBLICATIONS

International Search Report and Written Opinion for Application No. PCT/US2020/036528, dated Sep. 22, 2020, 17 pages.

*Primary Examiner* — Kevin T Bates
*Assistant Examiner* — Golam Mahmud
(74) *Attorney, Agent, or Firm* — Nutter McClennen & Fish LLP

(57) ABSTRACT

Illustrative embodiments disclose systems for sharing, among a group of consumers, data provided by a contributor. Some embodiments are well-suited for real-time distribution of data developing from ongoing incidents, and may be useful, for example, for emergency management. Illustrative embodiments provide a cloud-based system having tenants that are data contributors and data consumers. The system receives, from each contributor, both data and sharing rules that dictate whether and how that data may be shared, and with whom (which consumer or consumers), and then provide data to such consumer or consumers according to the sharing rules.

20 Claims, 17 Drawing Sheets

(51) Int. Cl.
*G06F 21/62* (2013.01)
*H04L 29/08* (2006.01)
*H04L 65/40* (2022.01)
*H04L 67/1097* (2022.01)

(58) Field of Classification Search
USPC .......................................................... 709/201
See application file for complete search history.

(56) References Cited

U.S. PATENT DOCUMENTS

| | | | |
|---|---|---|---|
| 8,234,704 B2 * | 7/2012 | Ghai | G06F 21/604 |
| | | | 726/16 |
| 8,763,010 B2 * | 6/2014 | Hacigumus | G06F 9/544 |
| | | | 719/313 |
| 9,213,858 B2 * | 12/2015 | Sharma | G06F 21/60 |
| 9,749,327 B2 * | 8/2017 | Storm | H04L 63/0807 |
| 10,074,052 B2 * | 9/2018 | Banerjee | H04L 67/306 |
| 10,554,750 B2 * | 2/2020 | Vasyutynskyy | H04L 67/1097 |
| 10,560,458 B2 * | 2/2020 | Drabant | G06F 9/4451 |
| 10,826,942 B2 * | 11/2020 | Brotherton | H04L 63/20 |
| 11,038,908 B2 * | 6/2021 | Vega | H04L 63/1425 |
| 11,070,670 B1 * | 7/2021 | Chalton | G06Q 50/265 |
| 2012/0144040 A1 | 6/2012 | Hacigumus et al. | |
| 2013/0198827 A1 * | 8/2013 | Bhaskaran | H04L 63/10 |
| | | | 726/7 |
| 2013/0246501 A1 * | 9/2013 | Scheer | G08B 25/006 |
| | | | 709/202 |
| 2015/0271557 A1 * | 9/2015 | Tabe | H04N 21/6131 |
| | | | 725/62 |
| 2015/0347765 A1 | 12/2015 | Hankins, Jr. et al. | |
| 2016/0112208 A1 * | 4/2016 | Williams | H04L 9/3268 |
| | | | 713/176 |
| 2017/0041391 A1 * | 2/2017 | Vasyutynskyy | H04L 67/1097 |
| 2017/0223302 A1 * | 8/2017 | Conlan | G08B 13/19695 |
| 2017/0293632 A1 * | 10/2017 | Pradeep | G06F 16/283 |
| 2018/0027059 A1 * | 1/2018 | Miller | H03M 7/4056 |
| 2018/0204433 A1 * | 7/2018 | Takahashi | H04N 7/18 |
| 2019/0014120 A1 | 1/2019 | Drabant | |
| 2019/0166161 A1 * | 5/2019 | Anand | G06N 20/00 |
| 2019/0354979 A1 * | 11/2019 | Crawford | G06Q 20/102 |
| 2020/0151360 A1 * | 5/2020 | Zavesky | G06F 21/6218 |
| 2020/0192897 A1 * | 6/2020 | Halstead | G06F 16/2471 |
| 2020/0204848 A1 * | 6/2020 | Johnson | H04N 7/188 |
| 2020/0404476 A1 * | 12/2020 | Sweet | H04W 4/021 |

* cited by examiner

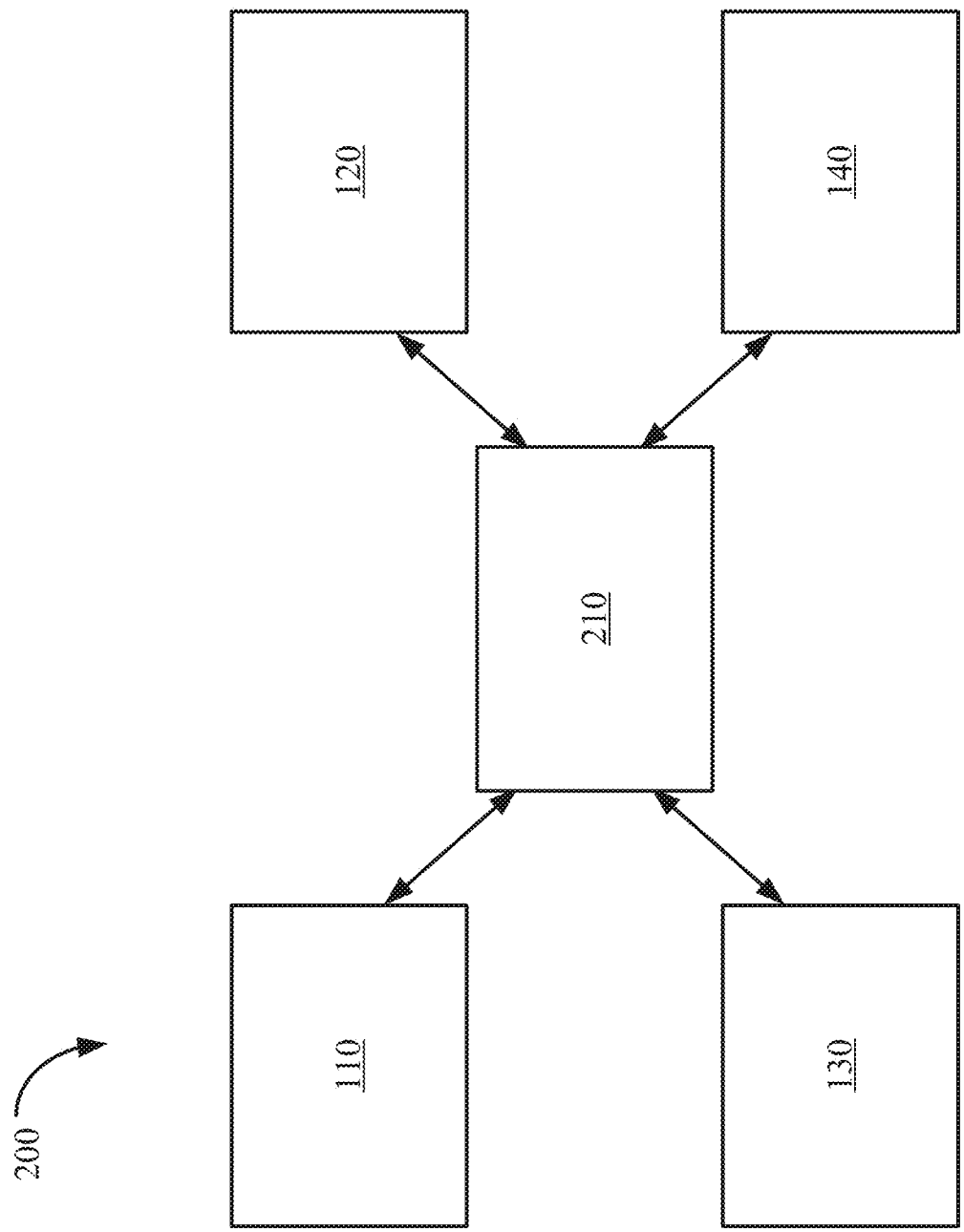

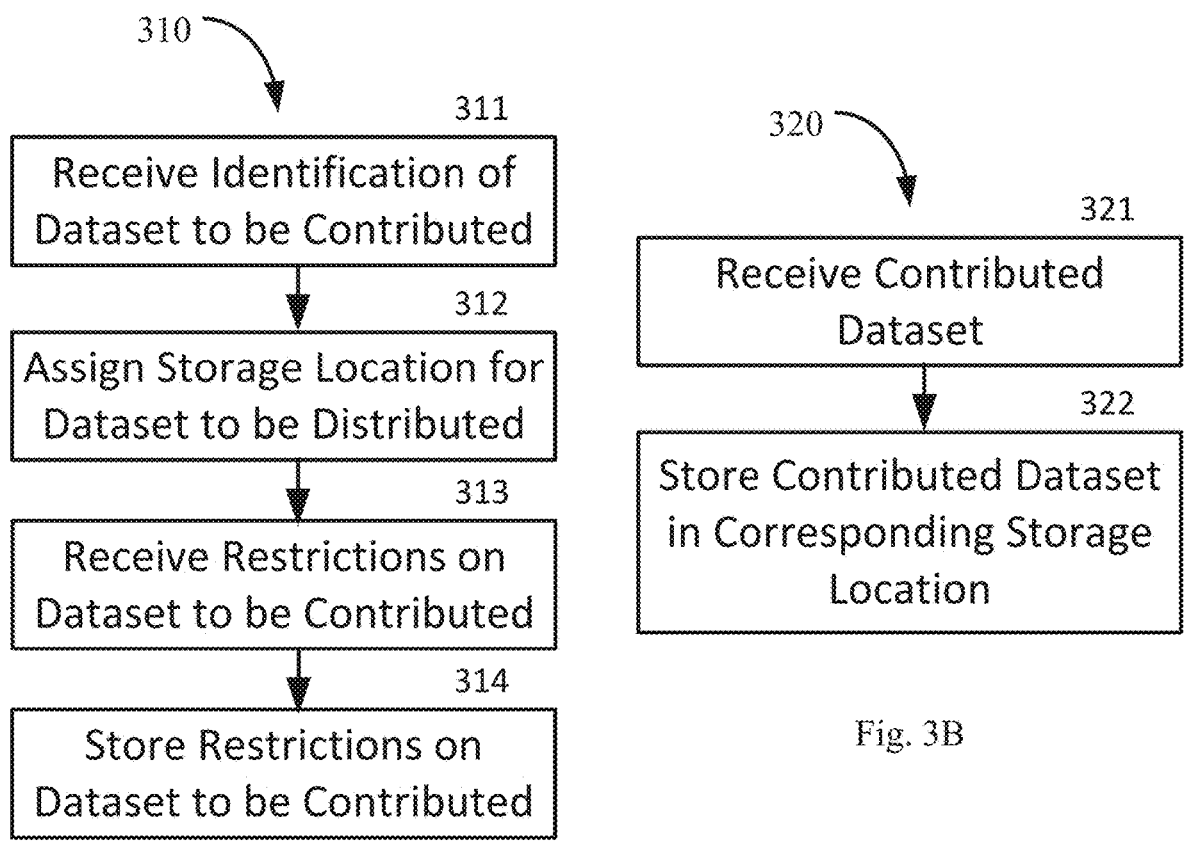

DATA SHARING CONTROL METHODS AND SYSTEMS

RELATED APPLICATIONS

This application claims priority to U.S. Provisional Application No. 62/858,447, filed Jun. 7, 2019 and titled "Project Galileo-Spark" and naming Mark Bailey, Phillip Barrett, Joshua Beard, Jamila Harbin, Jeremy Leshko, and Jared Phillips as inventors The disclosure of the foregoing is incorporated herein by reference, in its entirety.

FIELD OF THE INVENTION

The invention generally relates to data sharing among entities, more particularly, the invention relates to real-time data sharing among entities.

BACKGROUND OF THE INVENTION

It is known for an organization to share, with other parties, data generated by or held by that organization. For example, the police department of a city, and the fire department of the same city, may desire to share information about ongoing responses by those parties, respectively, with the city's manager. Each organization providing, or granting access to, its information may be described as a "contributor," and each party receiving information, or access to such information, may be described as a "consumer."

Each contributor organization, however, may desire to provide its information without allowing each other party (e.g., each consumer and/or each other contributor) unlimited, unfettered access to all of the contributor organization's information. In other words, the contributor organization needs to control (i) what data it will share with other parties, and (ii) with whom it will share data. Moreover, that control needs to operate on incoming data in real time.

SUMMARY OF VARIOUS EMBODIMENTS

In accordance with a first illustrative embodiment, a computer-implemented system (which may be referred-to as a "connector system") is configured for controllably sharing, with each of a set consumer tenants, data provided by each of a set of contributor tenants. In various embodiments, the system may be cloud-based, and/or the data sharing may be real-time data sharing.

The connector system includes a plurality of business capability modules. Each business capability module has an associated subject matter, and a corresponding memory to store only datasets having that subject matter.

The connector system also includes a core services module having a data store to receive and store sharing rules provided by a contributor. Such sharing rules specify how each dataset provided by that contributor may be shared with each consumer in a set of consumers.

The connector system also includes a capability service module. The capability service module is configured (i) to receive, from a consumer (the requesting tenant), a request to provide, from the system to the requesting tenant, a requested dataset; (ii) to request and receive data access information from the core services module, the data access information defining, based on sharing rules provided by a contributor of the requested dataset, how the requested dataset can be shared with the requesting tenant; (iii) to produce restricted response data pursuant to the data access information; and (iv) provide the restricted response data to the requesting tenant.

In some embodiments, the connector system further includes a gateway portal configured in data communication with the capability service module to receive, from a plurality of contributors, a plurality of datasets, each dataset having a corresponding subject matter; and a user interface in data communication with the core services module to receive, from a corresponding operator of each contributor of the plurality of contributors, and provide to the core services module: (a) designation of one or more datasets to be contributed by the contributor; and (b) a definition of sharing rules individually corresponding to each dataset. In some such embodiments, the user interface is also in data communication with the capability service module to receive from a requesting tenant, and provide to the capability service module, a request from the requesting tenant to provide, from the system to the requesting tenant, a requested dataset.

In some embodiments, the sharing rules provided by a contributor specify how each dataset provided by that contributor may be shared with other tenants includes rules limiting which other tenants may view the dataset; and the capability service module is configured to decline a request for a requested dataset, from a requesting tenant, which requesting tenant is not authorized by corresponding sharing rules to view the requested dataset.

In some embodiments, the sharing rules provided by a contributor to specify how each dataset may be shared with other tenants includes rules limiting the restricted response data to a redacted dataset; and the capability service module is configured to produce, as the restricted response data, said redacted dataset.

Another embodiment includes a computer-implemented system for controllably sharing, with each of a plurality of affiliated tenants, real-time data provided by each of plurality of contributors. In such an embodiment, the system includes a first contributor having a first dataset; a second contributor having a second dataset; a set of consumers desiring to access the first dataset and the second dataset; and a cluster of components of connect system 210, which cluster is remote from, and in data communication with, each of the first contributor and the second contributor.

The cluster includes a plurality of business capabilities, each business capability having an associated subject matter, and having a corresponding memory to store datasets having that subject matter; a core services module having a data store to receive and store sharing rules provided by a contributor to specify how each dataset may be shared with a set of consumers; and a capability service module the capability service module configured: (i) to receive, from a consumer of the set of consumers (the requesting tenant), a request to provide, from the system to the requesting tenant, a requested dataset; (ii) to request and receive data access information from the core services module, the data access information defining, based on sharing rules provided by a contributor of the requested dataset, how the requested dataset can be shared with the requesting tenant; (iii) to produce restricted response data pursuant to the data access information; and (iv) provide the restricted response data to the requesting tenant.

Some such embodiments also include a gateway portal configured in data communication with the capability service module to receive, from a plurality of contributors, a plurality of datasets, each dataset having a corresponding subject matter; and a user interface in data communication with the core services module to receive from a corresponding operator of each contributor of the plurality of contributors and provide to the core services module: (a) designation of one or more datasets to be contributed by the contributor; and (b) a definition of sharing rules individually corresponding to each dataset. In some such embodiments, the user interface is also in data communication with the capability service module to receive, and provide to the capability service module, a request from a requesting tenant to provide, from the system to the requesting tenant, a requested dataset.

In some embodiments, the sharing rules provided by a contributor specify how each dataset provided by that contributor may be shared with other tenants includes rules limiting which other tenants may view the dataset; and the capability service module is configured to decline a request for a requested dataset, from a requesting tenant, which requesting tenant is not authorized by corresponding sharing rules to view the requested dataset.

In some embodiments, the sharing rules provided by a contributor to specify how each dataset may be shared with other tenants includes rules limiting the restricted response data to a redacted dataset; and the capability service module is configured to produce, as the restricted response data, said redacted dataset.

In some embodiments, the first contributor includes a gateway (or "field gateway") in data communication with the gateway portal, the gateway and gateway portal configured to communicate the first dataset from the first contributor to the cluster.

In some embodiments, the first contributor includes a tenant, and said tenant includes a contributor user interface portal (or "viewer") in data communication with the cluster user interface to communicate, to the capability service module: (i) sharing rules provided by the tenant in its capacity as a contributor; and (ii) request to provide, from the system to the tenant, as a requesting tenant, a requested dataset.

Another embodiment includes a method of exchanging dataset among a plurality of tenants. The method includes providing a cluster of components of a connect system 210 remote from, and in data communication with, each a first contributor and a consumer. The cluster includes a plurality of business capability modules, each business capability having an associated subject matter, and having a corresponding memory to store datasets having that subject matter; a core services module having a data store to receive and store sharing rules provided by a contributor to specify how each dataset may be shared with a set of consumers; and a capability service module the capability service module configured: (i) to receive, from a consumer of the set of consumers (the requesting tenant), a request to provide, from the system to the requesting tenant, a requested dataset; (ii) to request and receive data access information from the core services module, the data access information defining, based on sharing rules provided by a contributor of the requested dataset, how the requested dataset can be shared with the requesting tenant; (iii) to produce restricted response data pursuant to the data access information; and (iv) provide the restricted response data to the requesting tenant.

The method also includes receiving, from the first contributor: (a) a first dataset having subject matter; (b) a first set of data sharing rules; storing the first dataset in a first business capability module; and storing the first set of data sharing rules in the core services module; and producing, from the first dataset, first restricted data; and providing to the consumer, in response to a request from the consumer, the restricted dataset.

In some embodiments, producing first restricted data includes redacting a subset of data from the first dataset.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 2A schematically illustrates an embodiment of a connector system disposed to enable data sharing among the entities;

FIG. 3A is a flow chart illustrating an embodiment of a method of receiving, at a connector system, metadata from a tenant;

FIG. 3B is a flow chart illustrating an embodiment of a method of receiving, at a connector system, datasets from a tenant;

DESCRIPTION OF ILLUSTRATIVE EMBODIMENTS

Illustrative embodiments disclose systems for sharing, among a group of consumers, data provided by a contributor.

Illustrative embodiments provide systems and methods for by which a contributor of time-sensitive data can selectively and controllably provide access to that data via a user interface. For example, some illustrative embodiments provide a cloud-based system having tenants that are data contributors and data consumers. The system receives, from each contributor, both data and sharing rules that dictate what data may be shared, and with whom (which consumer or consumers), and then provide data to such consumer or consumers according to the sharing rules.

Various embodiments enhance the ability of organizations to share time-sensitive data with other organizations. Some embodiments are well-suited for real-time distribution of data developing from ongoing incidents, and may be useful, for example, for emergency management.

Definitions

As used in this description and the accompanying claims, the following terms shall have the meanings indicated, unless the context otherwise requires.

A "contributor" is a tenant willing to share data under its control with a consumer. In illustrative embodiments, a contributor may also be a consumer of data provided by another party or organization.

A "consumer" is a tenant desiring to access data provided by a contributor. In illustrative embodiments, a consumer may also be a contributor of data under its control.

A "set" includes at least one member.

A "tenant" is a user of a system. A tenant may be a contributor, a consumer, or both.

Figure 1A:
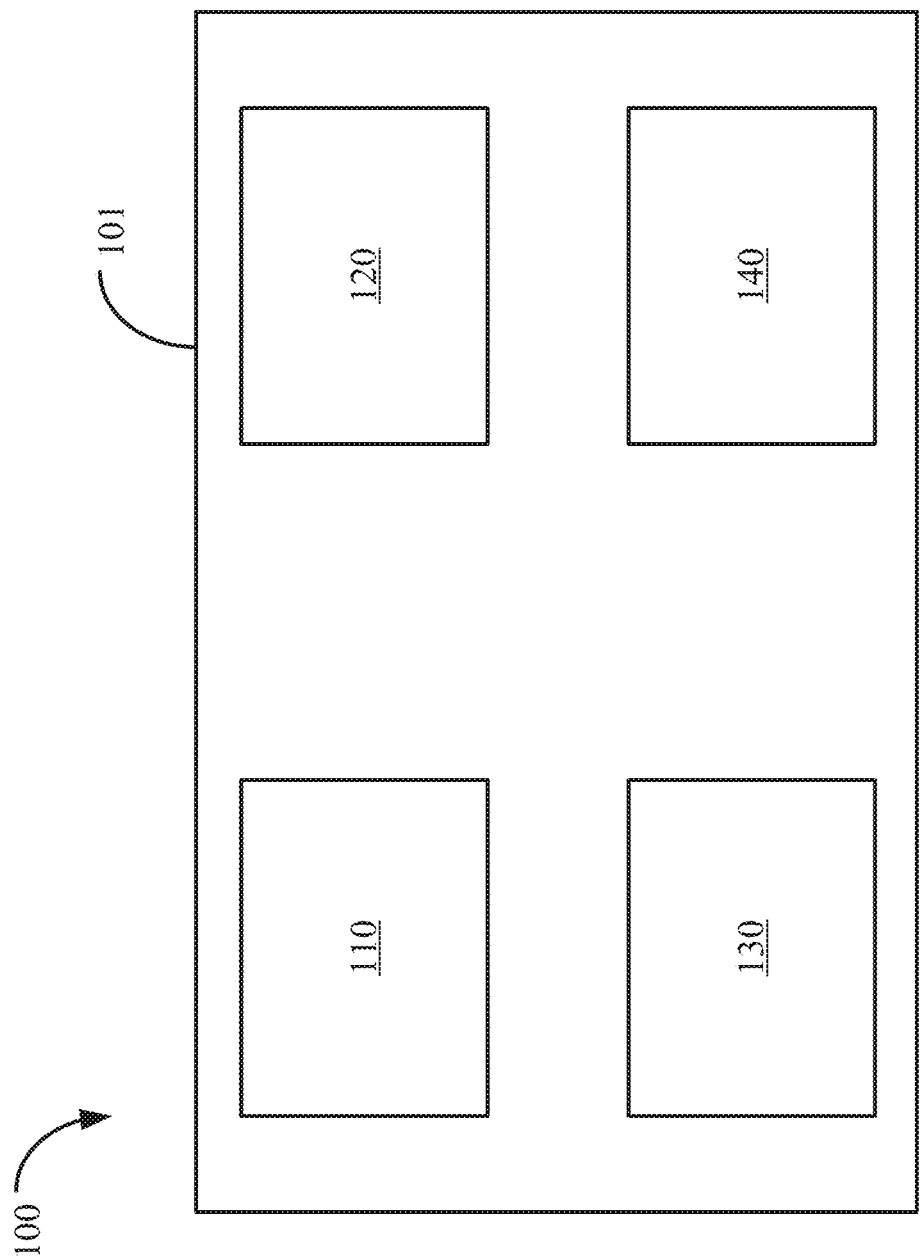
FIG. 1A schematically illustrates an embodiment of a set of entities that desire to share data among one another.

FIG. 1A schematically illustrates an embodiment of a plurality 100 of entities 110, 120, 130 and 140, each of which securely holds its respective data and/or desires to access data held by another of the entities 110, 120, 130 and 140. The several entities 110, 120, 130 and 140 are, in some embodiments, each a sub-organization of a parent organization 101. As an example, in some embodiments the parent organization 101 is a municipality (e.g., a state; a county; a city; or a town, to name but a few examples), or an emergency response agency for such a municipality, and each entity 110, 120, 130 and 140 is an affiliated public safety entity, such as a police department; fire department; rescue department; utility to name but a few examples.

Upon and during the occurrence of an alarm (e.g., a signal containing data indicating a condition that warrants attention, for example in response to some an event), one or more of the tenants 110, 120, 130 and 140 may analyze the alarm to assess whether to elevate the alarm to an incident (e.g., an event that warrants monitoring and/or a response). Each entity 110, 120, 130 and 140 may produce and/or gathers data relating to the alarm or incident, and developments of the ongoing incident. For example, a police department may respond to an incident by sending police units (e.g., police officers and/or police equipment) to the scene of the incident; a fire department may respond by sending fire unites (e.g., trucks) to the scene of the incident; a rescue department may respond by sending EMS units (e.g., an ambulance) to the scene of the incident, and a public works department may provide video from a video camera (the video camera is an example of a "device") near the scene of the incident. The responding police officers may produce data relating to their location and observations of the scene of the incident; the responding firemen may produce data describing their estimated time of arrival at the scene of the incident; and the responding ambulances may produce data describing their estimated time of arrival at the scene of the incident.

Each tenant 110, 120, 130 and 140 may provide at least some of its respective data to another tenant, and/or the parent organization 101 in its capacity as a consumer of the data. Typically, each consumer desires to receive such data in real-time (e.g., as it becomes available to the respective tenants), for example to provide to the consumer situational awareness of the incident and ongoing developments relating to the incident.

Possible Alternative Approaches to Data Sharing

There are several potential ways in which an entity could share its data with a one or more other entities, although each such potential way has undesirable shortcomings.

For example, one approach might be to create an individual connection between a contributor and each consumer. Due to this architecture, this may be thought-of as a "point-to-point" approach. Such an approach requires a point-to-point interface reside at each individual contributor, and requires each consumer to develop and maintain its own interface. Consequently, such an approach requires that each contributor and each consumer engage, and likely keep on an operating team, a highly-skilled technician to develop and maintain each interface. Moreover, as a network of point-to-point interfaces grows to include more consumers, the complexity of such an approach, and the cost of creating and maintaining it, would quickly become prohibitive.

Another approach might be to impose an intermediary between a contributor and each consumer in a publication/subscriber architecture in which the contributor is a publisher and a consumer is a subscriber. The intermediary acts essentially like a traffic cop using routing logic to direct data from contributor to consumer, for example over a network interconnecting contributors and consumers. Defining routing logic in the intermediary is a technical exercise usually performed by IT or other technical personnel because it deals with a lower level of detail (usually at the message level) instead of a higher, business related level. Such an approach would undesirably introduce a level of complexity to the system in that it requires use of the intermediary. In addition, the contributor (publisher) and each consumer (subscriber) would have to build and maintain its own interface to the intermediary, with the attendant disadvantages.

Another approach might be to give each contributor and each consumer access to a shared database. Such an approach is somewhat similar to the intermediary approach in that it requires a third party (in this case, the shared database) disposed between the contributor and each consumer. In addition to introducing a level of complexity by requiring such a shared database, and having many of the shortcomings of the intermediary approach, the shared database approach would also undesirably require copying and moving the shared data from the contributor to the shared database, and would also undesirably introduce loss of control by the contributor, and associated risk, in having the contributor's data stored in that shared database.

Some Advantages Over Alternative Possibilities

Illustrative embodiments provide one or more advantages over possible alternative approaches.

For example, some illustrative embodiments provide the data security and secure control of a point-to-point architecture, yet without the complexity and cost of creating and maintaining individual interfaces between the contributor and each consumer, and without the complexity and cost of approaches that use an intermediary, and without the complexity, cost, loss of data security and attendant risk of a shared database approach.

Illustrative embodiments enable a contributor to provide live data to consumers. This is important, for example, when the data is a streaming video from a responder at an accident scene, because the value of such data is diminished, if not destroyed, by lag in its transmission and receipt by a consumer. Illustrative embodiments enable live data sharing by providing domain-specific data stores (e.g., each contributor stores and transmits its data from its own data store) populated in real-time using field gateways. Moreover, the user interface of illustrative embodiments is multi-tenant which facilitates sharing data.

Moreover, illustrative embodiments enhance the consistency of data access, in that contributor and consumers access the same live data. Prior art systems and solutions undesirably introduce latency to shared data, if they are capable of provide consistency of data access at all. Illustrative embodiments provide an infrastructure which can provide fast access to the latest data by providing a single location for all interested parties (contributors and consumers) to retrieve the desired domain-specific data.

Illustrative embodiments enable concurrent access, by contributors and consumers, to shared data. Illustrative embodiments include cloud native architecture which easily scales and is equipped to handle large volumes of concurrent access to shared data.

Illustrative embodiments enable one-to-one, one-to-many, and many-to-many sharing relationships. Prior art data sharing technologies cannot provide one-to-one, one-to-many, and many-to-many data sharing relationship models since such technologies collapse under the load of adding more and more interfaces. Some prior art data sharing technologies become a resource bottleneck as more and more interfaces are added. The multi-tenant design at every architecture layer of illustrative embodiments provide the ability to support the required relationship models.

Illustrative embodiments also enable centralized control of data access from a set of user interfaces configured for use by non-technical users. Prior art data sharing technologies do not provide a user interface that allow a non-technical user to control data access. Rather, prior art data sharing technologies, if they include user interfaces at all, require the contributor to build a custom user interface as an extra application, or provide a user interface that requires defining access rules at the database level. In contrast, illustrative embodiments provide an administration interface that allows the creation of data sharing criteria based on organizational metadata, a data sharing network, and roles.

Illustrative embodiments enable granular control of access to data. For example, a contributor may desire to share with a consumer a subset of data, but deny access by that consumer to other portions of that data. Prior art technologies, if they allow granular access control at all, require setup at the database level, which many times requires specific expertise to setup. In contrast, illustrative embodiments provide a simple, easy-to-use user interface configured for use by non-technical users to define redaction and filtering rules based on domain specific metadata.

Illustrative embodiments enable the flexibility to scale to a large number of concurrent users. New data sources can be added incrementally, and when ready, data sharing criteria configured making data immediately available.

Illustrative embodiments enable management of data source separate from data sharing. A new data source can be brought online and when it is ready, data sharing rules can be setup to allow immediate access.

Illustrative embodiments enable secure and controlled access to shared data. Only authorized users within a contributor organization are allowed to setup rules for sharing data with other organizations. To that end, illustrative embodiments provide a simple user interface for setting up data sharing criteria. In contrast, prior art data sharing technologies usually require data access rules and logic to be coded into each application interface making it difficult to access the sharing criteria. Data sharing is usually setup by a technical person with the necessary skillset to define the sharing criteria. Not only does that require a level of technical expertise higher than that of the typical user, such a technical person is not always a member of the organization who owns the data, thereby undesirably requiring participation from outside resources to setup data sharing.

Illustrative embodiments provide subject matter-based storage of shared data, in contrast to some prior art technologies that require storage of shared data in a central data store.

Some embodiments provide a central capability for defining data sharing criteria for each business capability specifically defined to meet an organization's needs. This provides business and organization autonomy when it comes to managing data, but at the same time, promotes visibility to the entire data sharing environment through a centralized data sharing feature.

Illustrative embodiments provide domain-specific filtering logic. Some prior art data sharing technologies require an interface at each data contributor to track its data and format being shared with every consumer. The respective interface is typically different at each such consumer, which increases the complexity many times over and can become unmanageable. Illustrative embodiments provide a simple administration user interface which can be used by non-technical personnel for defining filtering rules for data sharing. In some such embodiments, filtering rules are defined for each business domain item and can be overridden at the tenant level.

Illustrative embodiments provide a loosely-coupled architecture. In illustrative embodiments, each business capability is implemented as a stand-alone set of micro-frontends and micro-services. This allows each business capability to scale independently and can be managed separately from the rest of the system.

FIG. 2A schematically illustrates an embodiment of a system 200 in which each of the several tenants 110, 120, 130 and 140 is a contributor and/or a consumer in communication with a central cluster (or "hub") 210.

Each such contributor controllably provides its respective data to a central cluster 210. In some embodiments, each contributor limits the availability of its respective information to each of the other entities.

For example, a police department may produce both incident data (e.g., a summary of the incident, including the nature of the incident and its location) by an incident entity, and alarm data (e.g., notifications triggered by the occurrence of conditions associated with the incident). The incident data may be held under control of an incident business entity within the police sub-entity, and the alarm data may be held under control of an alarm business entity within the police sub-entity, and each of those business entities can independently control what data gets shared, and with whom it gets shared. In other words, the incident data and the alarm data are not subject to the same control just because they belong to the same sub-entity (i.e., the police department), but are independently controllable by their respective business entities.

Figure 2B:
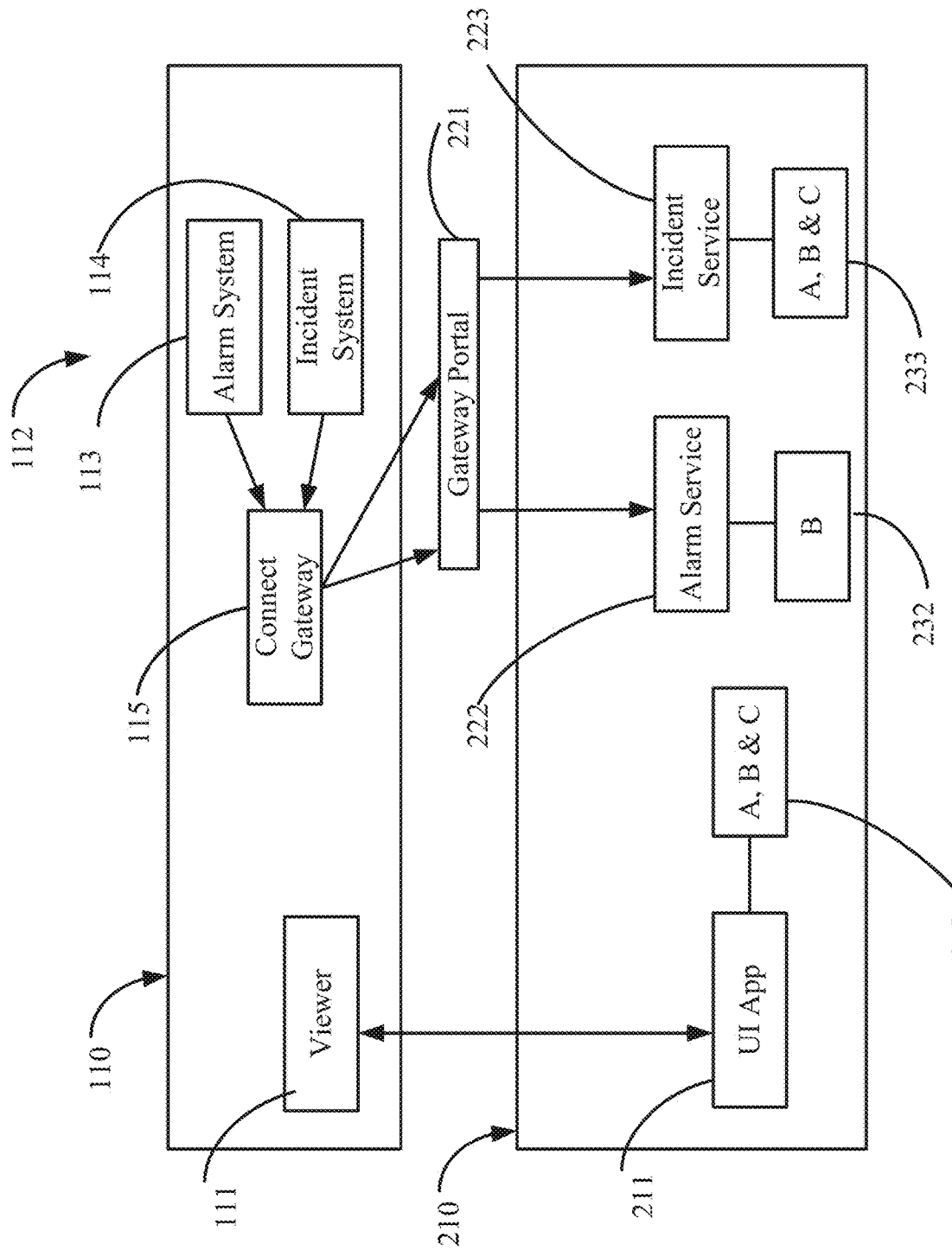
FIG. 2B schematically illustrates an embodiment of a tenant in communication with an embodiment of a connector system.
Figure 2C:
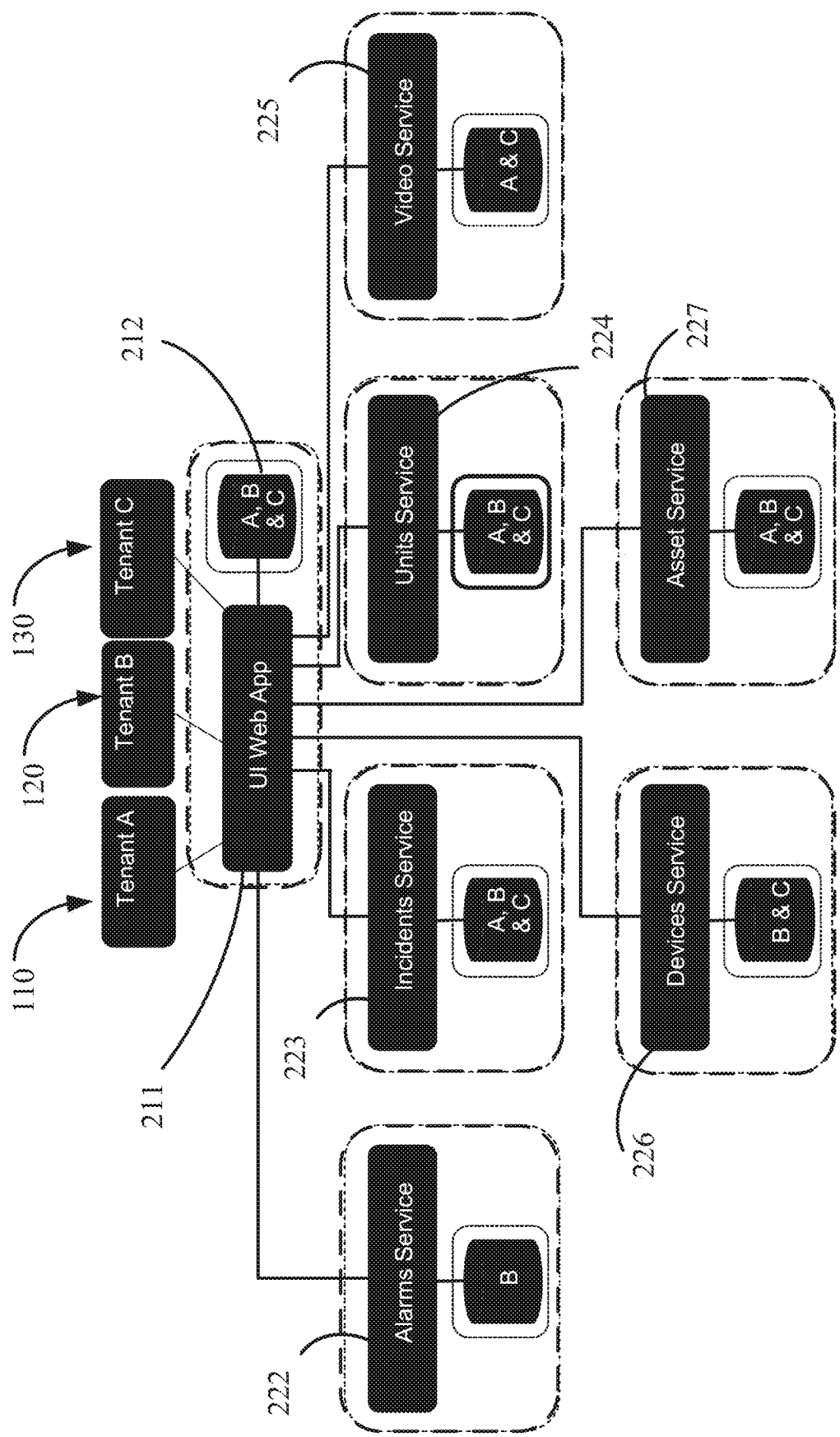
FIG. 2C schematically illustrates an embodiment of several tenants in communication with an embodiment of a connector system.

FIG. 2B schematically illustrates an illustrative embodiment of a tenant 110 and an embodiment of a connector system 210 (which may be referred to as a "cluster"). FIG. 2C schematically illustrates and another embodiment of a connector system 210.

The tenant 110 has a set of at least one data generating devices or apparatuses. The illustrative embodiment of FIG. 2B includes a set 112 having a plurality of data generating apparatuses 113, 114. Each data generating apparatus generates at least one dataset of data. For example, a data generating apparatus may be an alarm, such as an alarm on a rear exit of a movie theater, or an alarm coupled to the door of a bank vault, or a video camera, to name but a few illustrative examples.

The tenant 110, in its capacity as a contributor, may desire to share one or more of those generated datasets with one or more other tenants 120 and/or 130 and/or 140, for example. To that end, the tenant 110 includes a connect gateway (or "field gateway") 115 in communication with teach of the data generating devices. The connect gateway is a communications device configured to couple with a connect portal in a cluster system 210, described below.

The tenant 110, in its capacity as a contributor, may also desire to limit how, and with whom (e.g., with which other tenant or tenants 120, 130 and/or 140) to allow its data to be shared. To that end, the tenant 110 includes a tenant UI viewer 111 configured to communicate with a corresponding UI APP 211 in the cluster 210. The tenant viewer 111 may be, for example, a web browser that displays a user interface produced by the UI APP 211 in the cluster 210. To that end, in some embodiments the tenant viewer 111 is configured for bidirectional communication with the UI APP 211 in the cluster 210. In some embodiments, the content and format of the tenant viewer 111 is generated by the UI APP 211 and communicated to the tenant for display to an operator at the tenant 110. In illustrative embodiments, the tenant 110 executes software at the tenant's premises to run and/or display the content and format of the viewer 111.

In illustrative embodiments, when the tenant 110 is operating as a contributor, an operator at the tenant 110 using the viewer 111 specifies sharing rules, respectively, for the data provided to the cluster 210 from each respective data generator (e.g., 113, 114). The viewer 111 supplies such defined sharing rules to the cluster 210 via the UI APP 211.

In illustrative embodiments, when the tenant 110 is operating as a consumer, the tenant 110 may desire to request data from the connector system 210. Such requested data may include data provided to the connector system 210 by the tenant 110 itself (e.g., for example if an operator at the tenant 110 wants to monitor the data provided by the tenant to the connector system 210) and/or data provided to the connector system 210 by one or more other tenants 120, 130, 140.

To that end, the tenant viewer 111 is configured to receive, from the operator, specification of the data to be requested, and to submit to the connector system 210, via the UI APP 211, the specification of data requested. Such a request may be referred to as an "operation."

The connector system 210 schematically illustrated in FIG. 2B may be implemented in a single, powerful computer, or may be implemented using resources in the cloud.

The connector system 210 includes the UI APP 211, preferably in communication with the tenant viewer 111 of the tenant 110. The UI APP 211 is in data communication with a sharing rules data store 212. The tenant's viewer 111 receives, and provides to the sharing rules data store 212, sharing rules from the tenant 110. Illustrative embodiments of the sharing rules datastore 212 associates each tenant (e.g., 110, 120, 130) respectively, with the sharing rules (represented by "A", "B," and "C", respectively, in FIG. 2B) provided by that tenant 110, 120, 130.

The connector system 210 also includes a gateway portal 221 in communication with a connect gateway 115 (or "field gateway") at each the tenant 110, and each other tenant 120, 130, respectively. In illustrative embodiments, the gateway portal 221 is disposed between the connect system 210 and each tenant 110, 120, 130, 140, as schematically illustrated in FIG. 2B. For example, the gateway portal 221 may be disposed in the cloud. In some embodiments, the gateway portal may be thought-of as part of the connect system 210, even though it may be implemented separately.

In illustrative embodiments, the gateway portal 221 is in data communication with each of a plurality of application program interfaces (each of which may be referred-to as a "REST API"), one such API for each corresponding service module (e.g., service module 222 and service module 223). The gateway portal 221 distributes data received from a corresponding connect gateway based on the subject matter of that data. Each dataset received from a tenant 110 has an associated subject matter. For example, the subject matter of a dataset produced by an alarm system 113 is "alarm" data, and the subject matter of a dataset produced by an incident system 114 is "incident data." The datasets are segregated by their respective subject matter, and stored in separate memories.

To that end, in illustrative embodiments, the connector system 210 includes a set of service modules (or simply "services"), each service modules assigned to store data having a corresponding subject matter. For example, alarm data (e.g., from an alarm system 113 at tenant 110) is directed from the gateway portal 221 to alarm service module 222. Similarly, incident data (e.g., from an incident system 114 at tenant 110) is directed from the gateway portal 221 to incident service module 223.

It should be noted that, in some embodiments, streaming video data, such as data produced by a video camera, is not stored in a service module. Storing such video data in a service module would undesirably delay the sharing of the video data with a consumer. In some such embodiments, metadata about the video data (e.g., the identity of the camera that produces the video stream; the location of the camera that produces the video stream; the orientation of the video camera that produces the video stream; technical details of the video camera that produces the video stream, to name but a few examples) may be provided by the tenant 110 to the connector system 210, and stored in a service module designated for storing such video metadata from contributors. The video stream itself, when it is provided to a consumer, is streamed directly from the contributor to the consumer through the connector system 210.

It should also be noted that, in preferred embodiments, each service module (e.g., 222, 223) stores data from all tenants, which data has the subject matter associated with the service module. For example, the alarm service module 222 stores all alarm data from all tenants 110, 120, 130.

It should also be noted that, in preferred embodiments, each service module (e.g., 222, 223) stores such data separately. In other words, even when a service module stores a plurality of data sets from a plurality of contributors, each dataset is stored, and is retrievable from the service module, independently.

As schematically illustrated in FIG. 2B, sharing rules from each contributor for each dataset provide by that contributor is associated with the respective service module in which that dataset is stored. For example, if Alarm Service module 222 is storing alarm data only from tenant B, the sharing rules provided by that tenant and stored in data store 212 are associated with Alarm Service module 222.

Figure 2D:
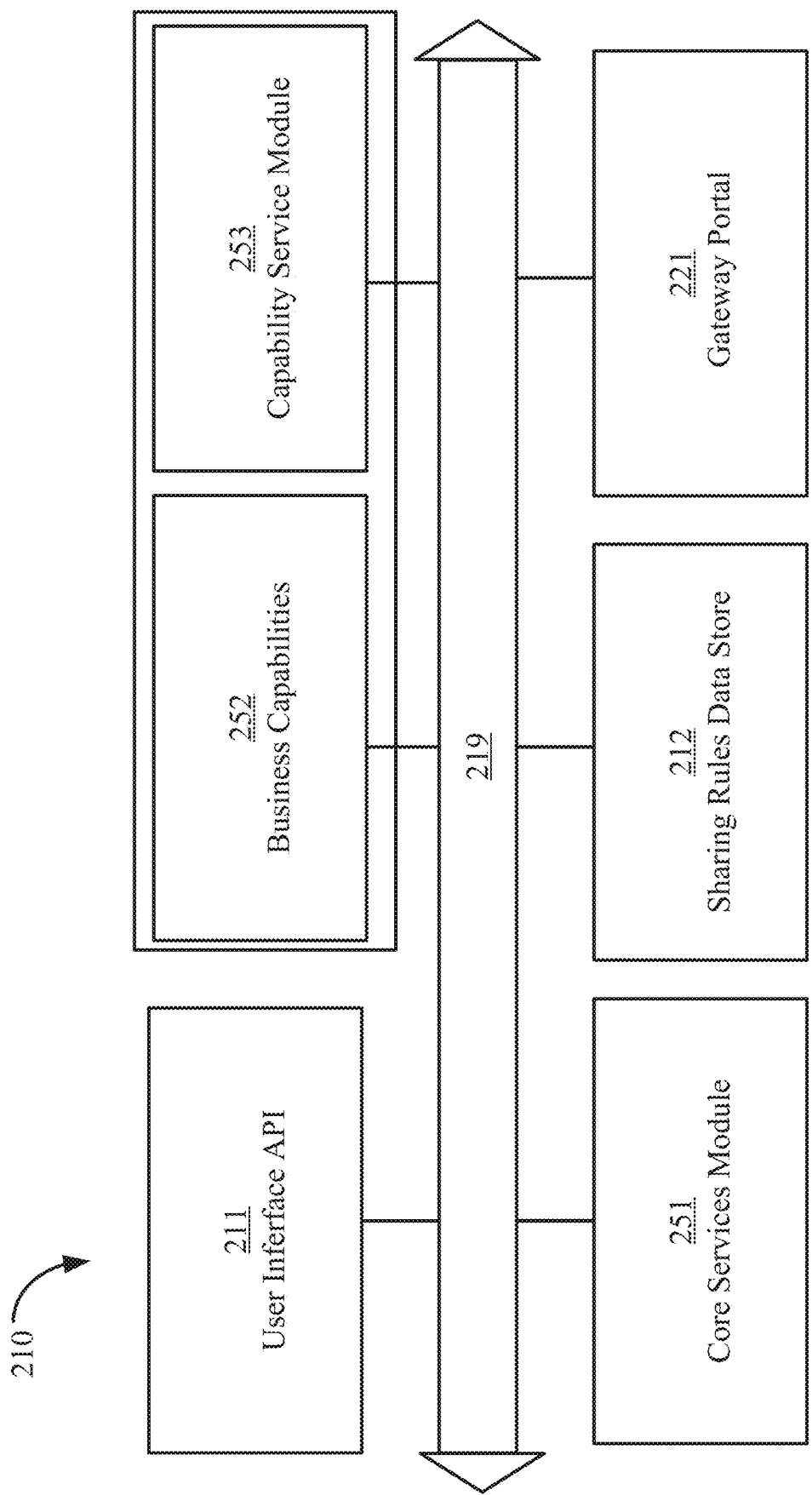
FIG. 2D schematically illustrates an embodiment of a connector system.

FIG. 2D schematically illustrates an embodiment of a connector system 210. The system 210 includes a plurality of modules in communication with one another over a system bus 219. The system 210 includes a UI APP 211, a sharing rules data store 212, a gateway portal 221, a core services module 251 (which module may also be referred to a "common services"), a set 252 of business capability modules (the business capability module may also be referred to as a "capability services"), and a capability service module 253.

The core services module 251 is configured to interface with a tenant, such as a consumer that desires to request a dataset from the connector system 210. In illustrative embodiments, the core services module also stores sharing rules provided for each dataset by the contributor of that dataset.

The business capabilities module 252 includes the service modules that store datasets received from contributors. The business capabilities module 252 is in data communication with the capability service module 253.

In some embodiments (including in the embodiments of FIG. 2D and FIG. 2E), the business capability module is part of the capability service module 253. In preferred embodiments, the business capabilities module 252 is part of the capability service module 253, to keep the datasets close to the service module 253 to facilitate quick, easy and secure access by the service module 253 to the datasets.

The capability service module 253 is configured to receive a request from a requesting tenant (e.g., via the UI APP 211) for an "operation" (e.g., a process of preparing and sending to the requesting tenant a dataset in response to the request), and to prepare and provide to the requesting tenant a response to the request from the requesting tenant.

Figure 2E:
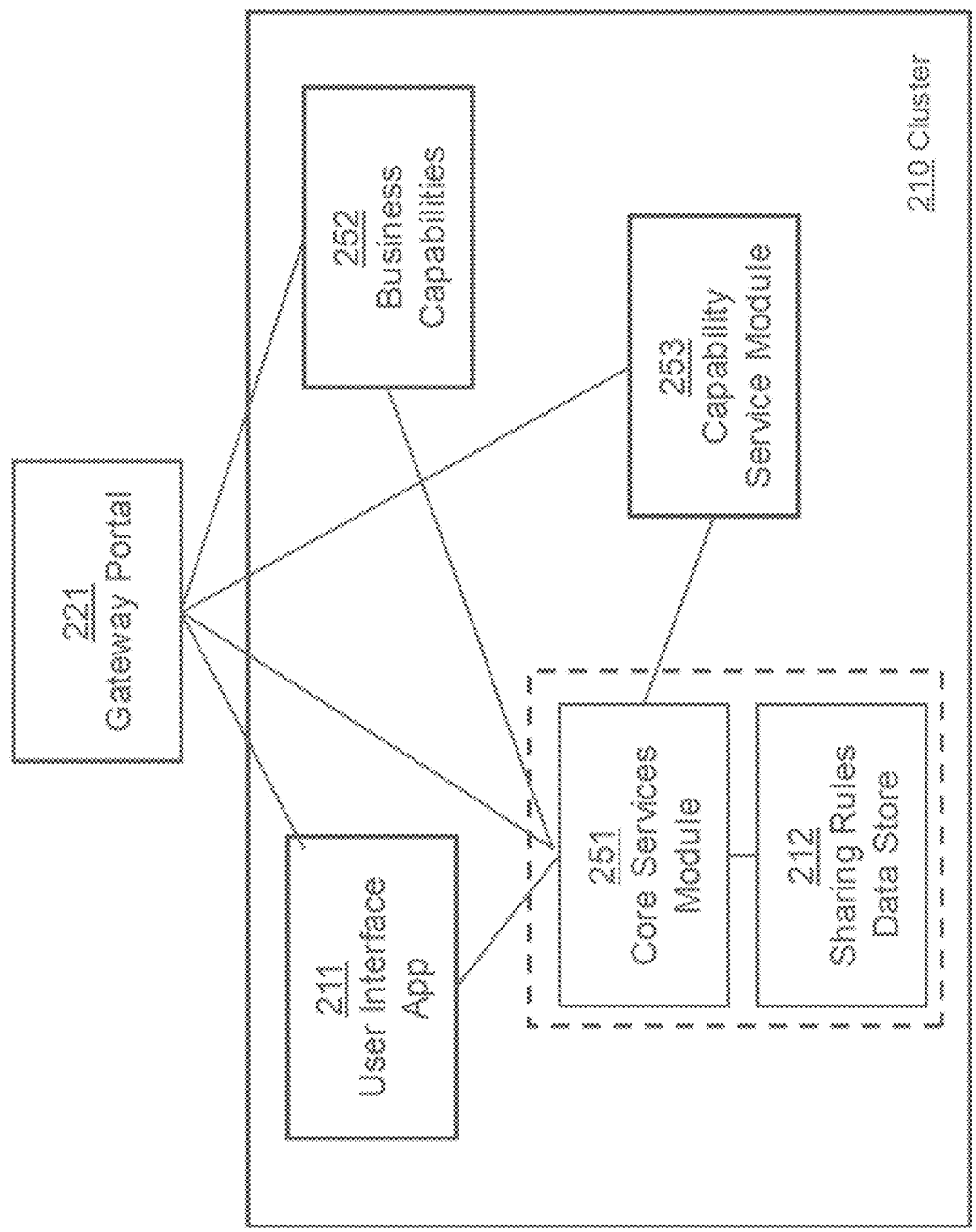
FIG. 2E schematically illustrates an alternative embodiment of a connector system.

FIG. 2E schematically illustrates an alternative embodiment of a connector system 210. This embodiment may be referred-to as a "cluster," in that its components (211; 212; 221; 251; 252 and 253) are disposed in a cloud, and the components are not coupled by a bus (as in FIG. 2D) but are instead in communication over the cloud. In the embodiment of FIG. 2E, the gateway portal 221 is in data communication with the UI APP 211, the business capability module 252, the capability service module 253, and the core services module 251. The core services module 251 is, in turn in data communication with the sharing rules data store 212, even though the sharing rules data store 212 is not in direct communication with the gateway portal.

In any case, the connector system 210, whether a system as in FIG. 2D or a cluster as in FIG. 2E, may be referred-to as a "hub" because it is in communication with each tenant of a plurality of tenants.

FIG. 3A is a flow chart illustrating an embodiment of a method 310 of receiving, at a connector system 210, metadata from a tenant. The method 310 includes at step 311 receiving, at the connector system from a contributor (for example tenant 110) metadata including identification of one or more datasets (e.g., alarm data; incident data) to be provided by the contributor 110 to the connector system 210.

At step 312, the method includes assigning a storage location for the datasets identified at step 312. As described above, each dataset has an associated subject matter, and each dataset is assigned to a service module according to its respective subject matter.

At step 313, the method 310 includes receiving, at the connector system from the same contributor 110 metadata including sharing rules for each dataset identified at step 311. The sharing rules specify, for each such dataset, what data in that dataset may be shared, and which whom (i.e., which consumer).

At step 314, the sharing rules are stored in a sharing rules datastore 212.

FIG. 3B is a flow chart illustrating an embodiment of a method 320 of receiving, at a connector system, datasets from a tenant.

At step 321, the method 320 includes receiving a dataset from a contributor. Each such dataset has an associated subject matter.

At step 322, the method 320 includes storing each such dataset in a service module (e.g., 222; 223, etc.) assigned to store such datasets according to subject matter.

FIG. 3C, FIG. 3D, FIG. 3E, FIG. 3F, FIG. 3G and FIG. 3H each discloses an embodiment of a graphical user interface displayed by a tenant's viewer 111 at the tenant's premises.

Figure 3C:
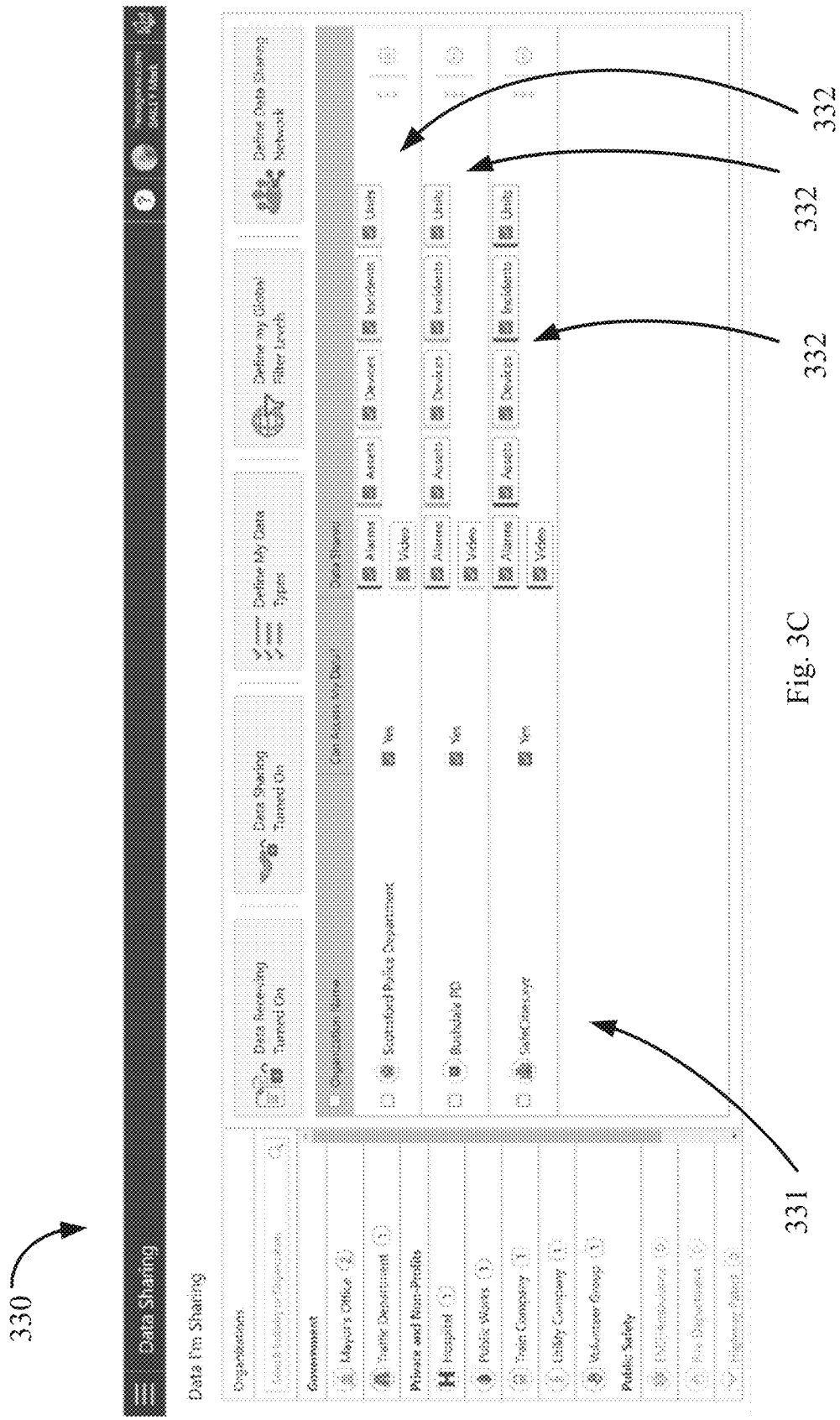
FIG. 3C illustrates embodiment of a graphical user interface displayed in a tenant's user interface.

FIG. 3C illustrates a graphical user interface 330 configured to allow an operator at a contributor 110 to specify with who the contributor's data can be shared, and which of the contributor's data can be shared. In this illustrative embodiment, the contributor has several datasets 332 defined by subject matter: alarm data, asset data, device data, incident data, units data, and video data. The operator has given permission, to a connector system 210, to share all of that data with each of three consumer tenants (in this illustrative embodiment, Scottsford Police Department; Bushdale Police Department; and a tenant named SafeCities.xyz), which consumer tenants define the contributor's data sharing network 331. That permission defines at least a portion of the data sharing rules for the indicated data from the contributor 110. The operator can withdraw permission for any such consumer tenant by un-checking that tenant's name, and can withdraw permission for any dataset by un-checking that dataset's icon. This provides to the contributor 110 with granular control over what data gets shared, and with whom.

Figure 3D:
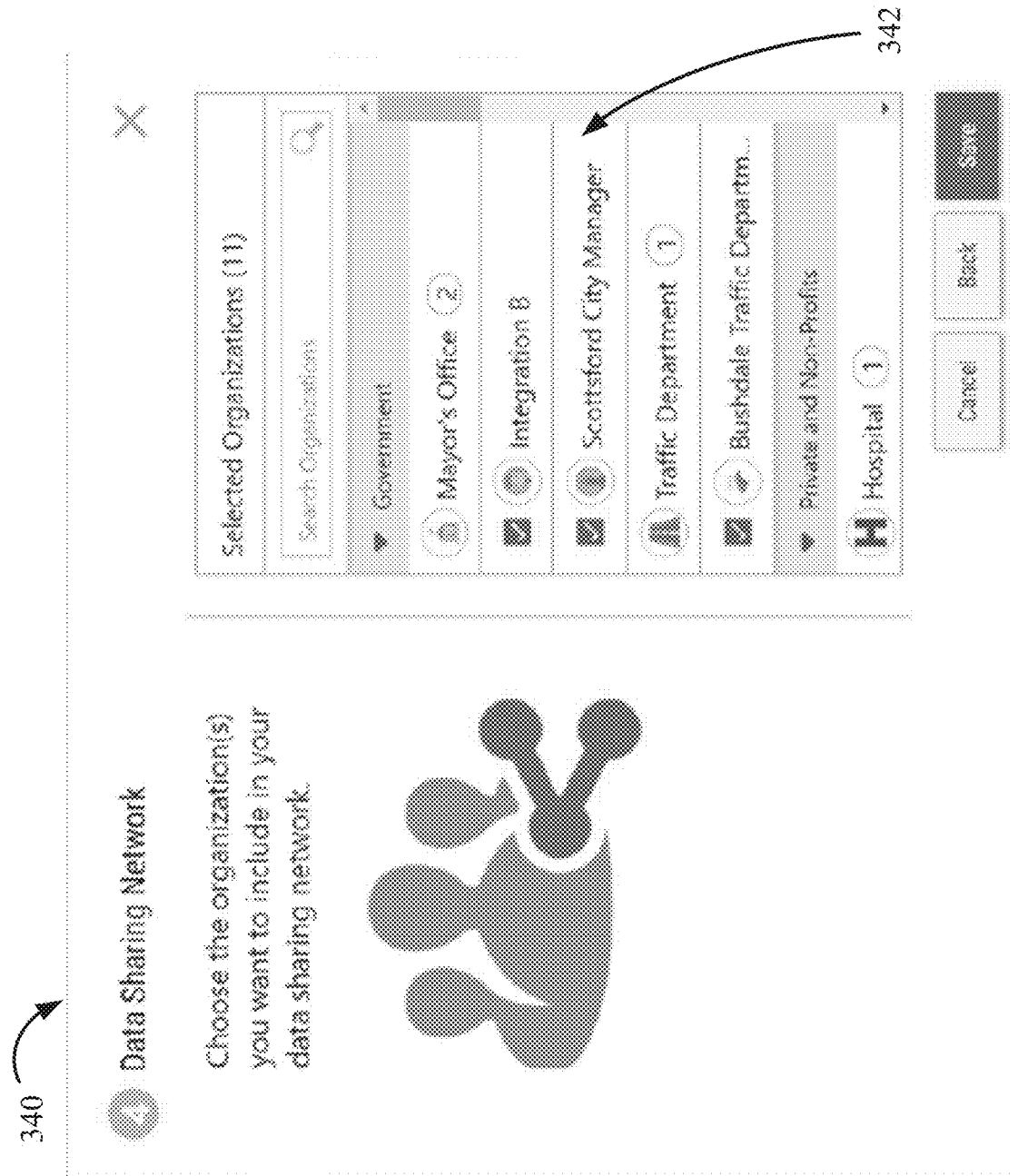
FIG. 3D illustrates embodiment of a graphical user interface displayed in a tenant's user interface.

FIG. 3D illustrates a graphical user interface 340 configured to add or remove consumer tenants from its data sharing network. To that end, the graphical user interface 340 presents a menu 341 of consumer tenants from which the contributor's operator may chose, and add to the list of consumer with whom the contributor 110 is willing to share at least some contributors data.

Figure 3E:
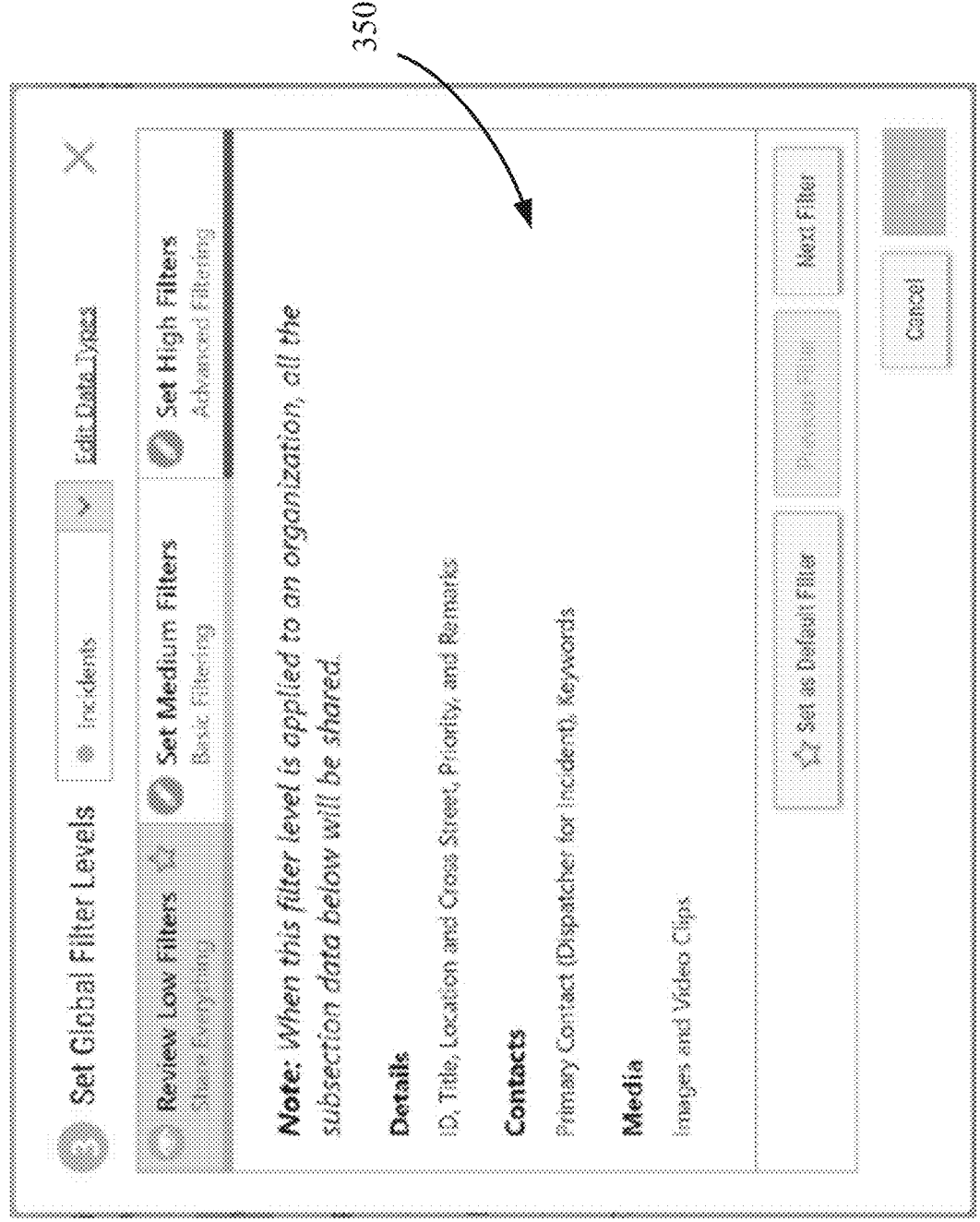
FIG. 3E illustrates embodiment of a graphical user interface displayed in a tenant's user interface.
Figure 3F:
FIG. 3F illustrates embodiment of a graphical user interface displayed in a tenant's user interface.
Figure 3G:
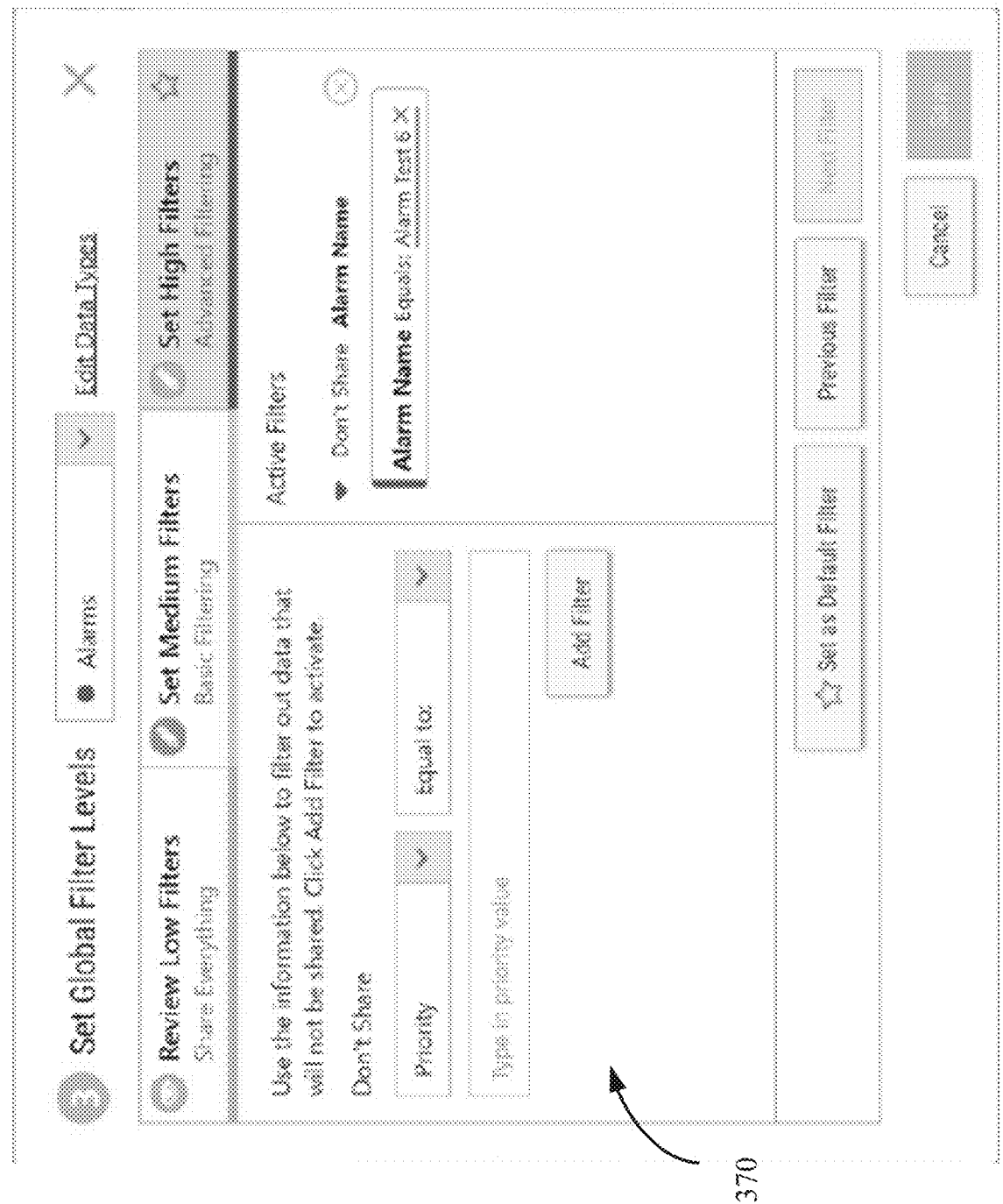
FIG. 3G illustrates embodiment of a graphical user interface displayed in a tenant's user interface.

FIG. 3E, FIG. 3F and FIG. 3G each presents a graphical user interface that allows a contributor to define sharing rules regarding what contributor data may be shared by a connect system 210 without having to specify that data at a granular level (although that option remains available as in the embodiment of FIG. 3C).

FIG. 3E illustrates a graphical user interface 350 of a set of "low" filters. Low filters indicate that all of the contributor's data may be shared by a connector system 210.

FIG. 3F illustrates a graphical user interface 360 of a set of "medium" filters. Medium filters are configurable, by an operator at a contributor using the graphical user interface 360, to restrict permission to share some data. For example, in the embodiment of FIG. 3F, the operator has indicated that the connect system 210 may not share "Device Current Location" data, which is part of "Devices" data type (i.e., datasets having "devices" subject matter), but may share "Device Description Data" and "Device Telemetry" data. Such specific rules may indicate, to the connect system 210, that when the connect system 210 shares with a consumer a specified dataset, the connect system must redact certain data from that dataset.

FIG. 3G illustrates a graphical user interface 370 of a set of "high" filters. High filters are configurable, by an operator at a contributor using the graphical user interface 370 to specify under what conditions the connect system 210 should withhold data (i.e., the entire dataset is filtered out and not sent to the requesting tenant 120). Such specific filters indicate, to the connect system 210, when the connect system 210 should share a specified dataset with a consumer. In the example of FIG. 3G, the operator at the contributor has used the graphical user interface 370 to specify that when the connect system 210 shares alarm data, it must remove (in other words, not share with a requesting tenant) any datasets when the "Alarm Name" in those datasets is equal to "Alarm Test 6."

Figure 3H:
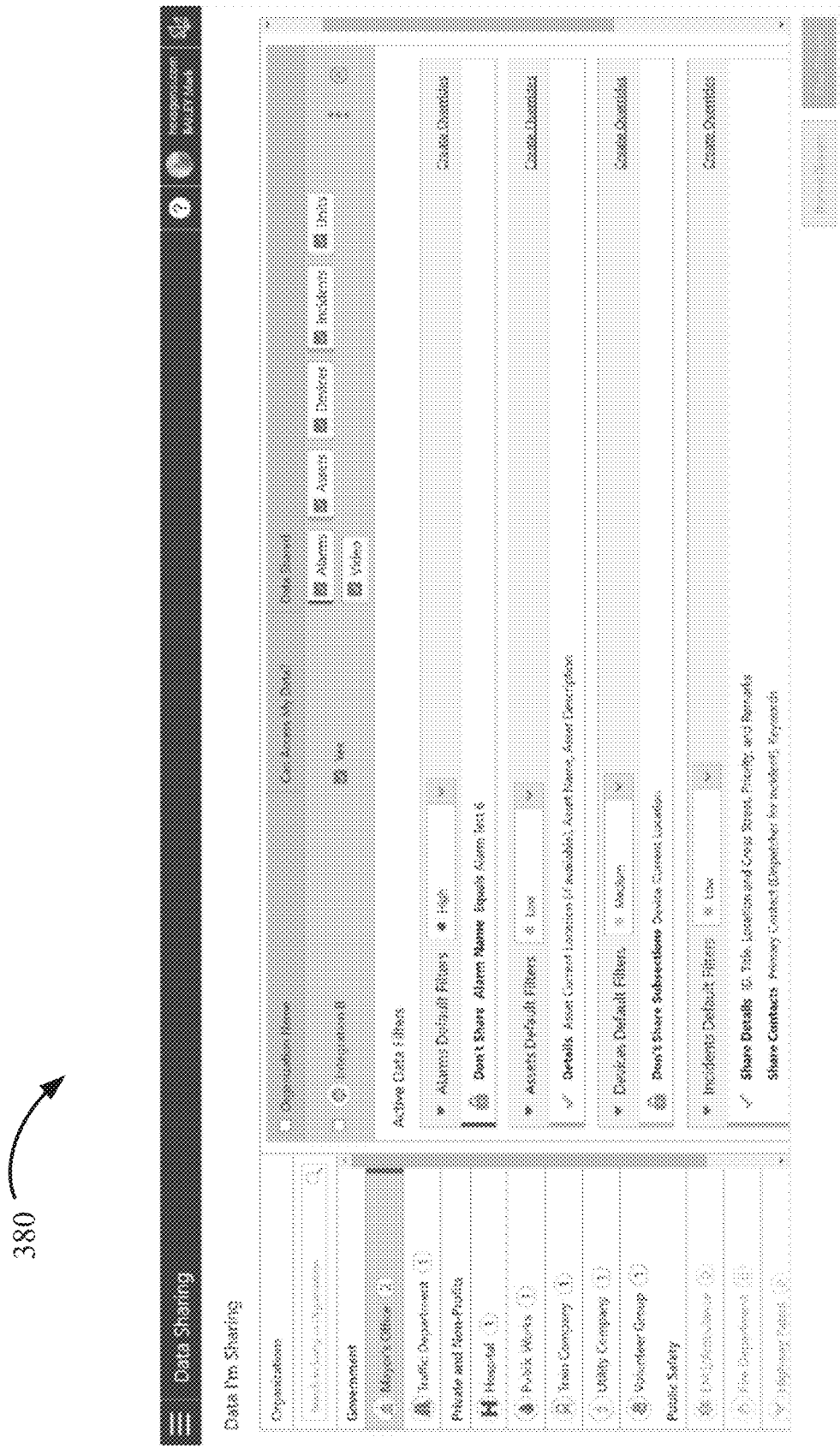
FIG. 3H illustrates embodiment of a graphical user interface displayed in a tenant's user interface.

FIG. 3H illustrates a graphical user interface 380 configured to provide, to the operator at the contributor, the present sharing rules specified by the contributor 110.

Figure 3I:
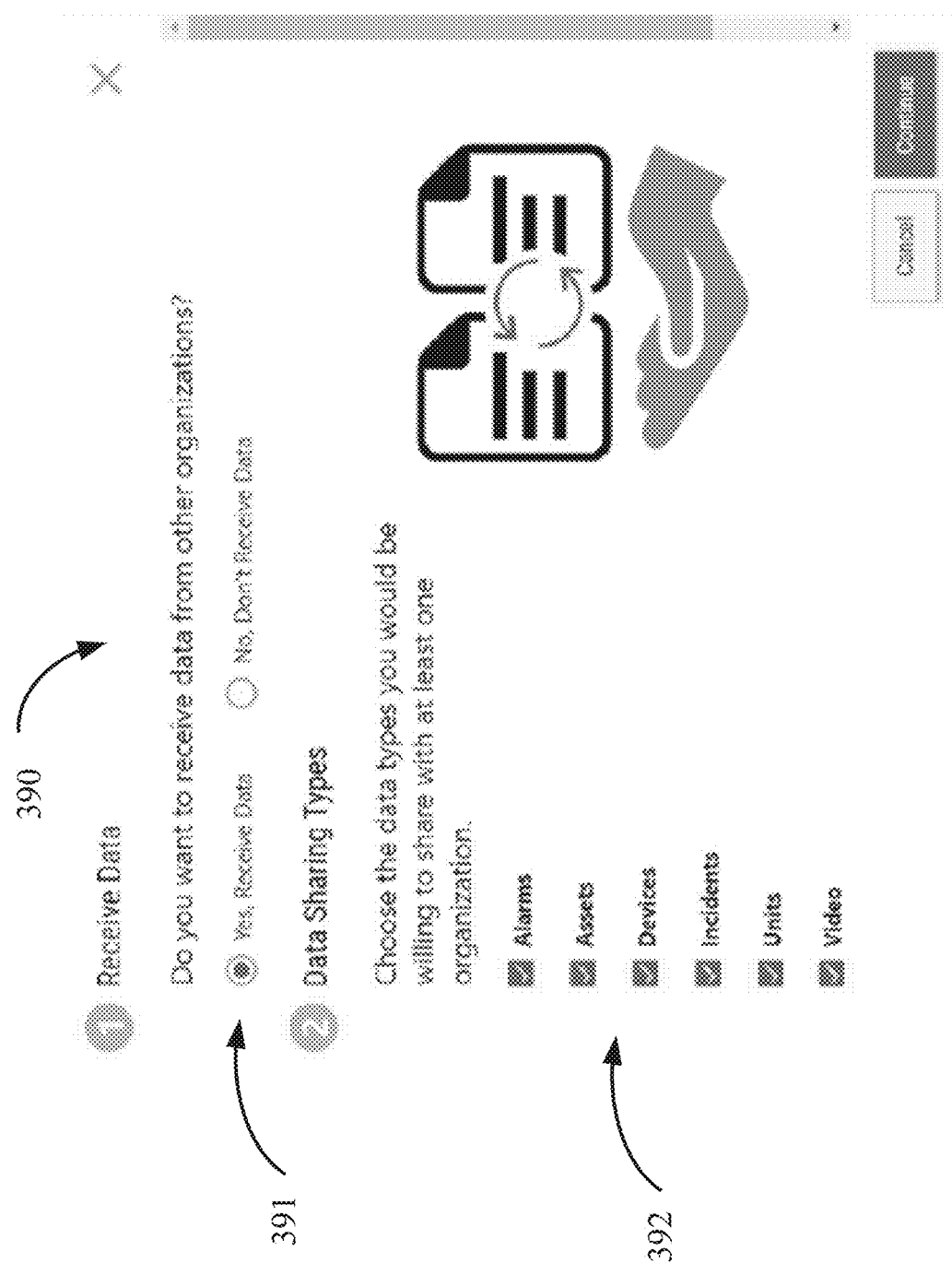
FIG. 3I illustrates embodiment of a graphical user interface displayed in a tenant's user interface.

FIG. 3I illustrates a graphical user interface 390 by which an operator acting as a consumer tenant 120 may request data from a connect system 210. To that end, the embodiment of graphical user interface 390 of FIG. 3I includes a set 391 of radio buttons that allows the operator to opt in to receiving data from the connect system, or to opt-out of receiving such data by selecting the "Yes" and "No" radio buttons, respectively.

The embodiment of graphical user interface 390 of FIG. 3I also includes a set 392 of check boxes, with one check box for each type (where types are defined by the subject matter of each dataset, respectively) of dataset stored within the connect system. By checking a check box corresponding to a dataset, the operator, acting as contributor, indicates to the connect system 210 that the contributor is willing to share such datasets with the consumer. By unchecking such a checkbox (or declining to check such a checkbox) the contributor indicates that the connect system should withhold from consumers, such datasets provided by the contributor.

Consequently, a contributor has granular control of what, if any, of its data is made available to consumer by the connect system 210.

Figure 4A:
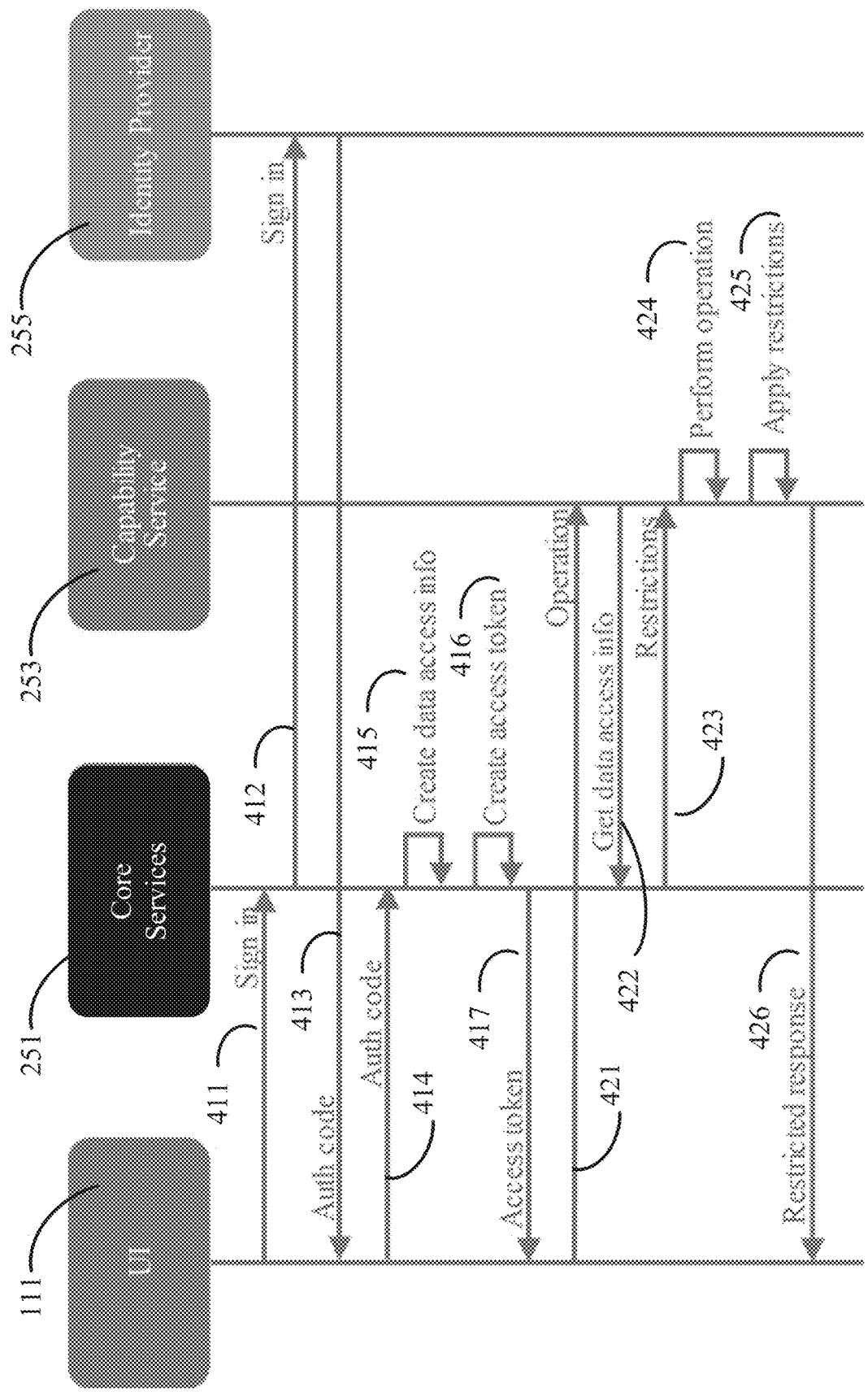
FIG. 4A schematically illustrates dataflow between an embodiment of a consumer tenant and an embodiment of a connector system, and data flow within an embodiment of the connector system.
Figure 4B:
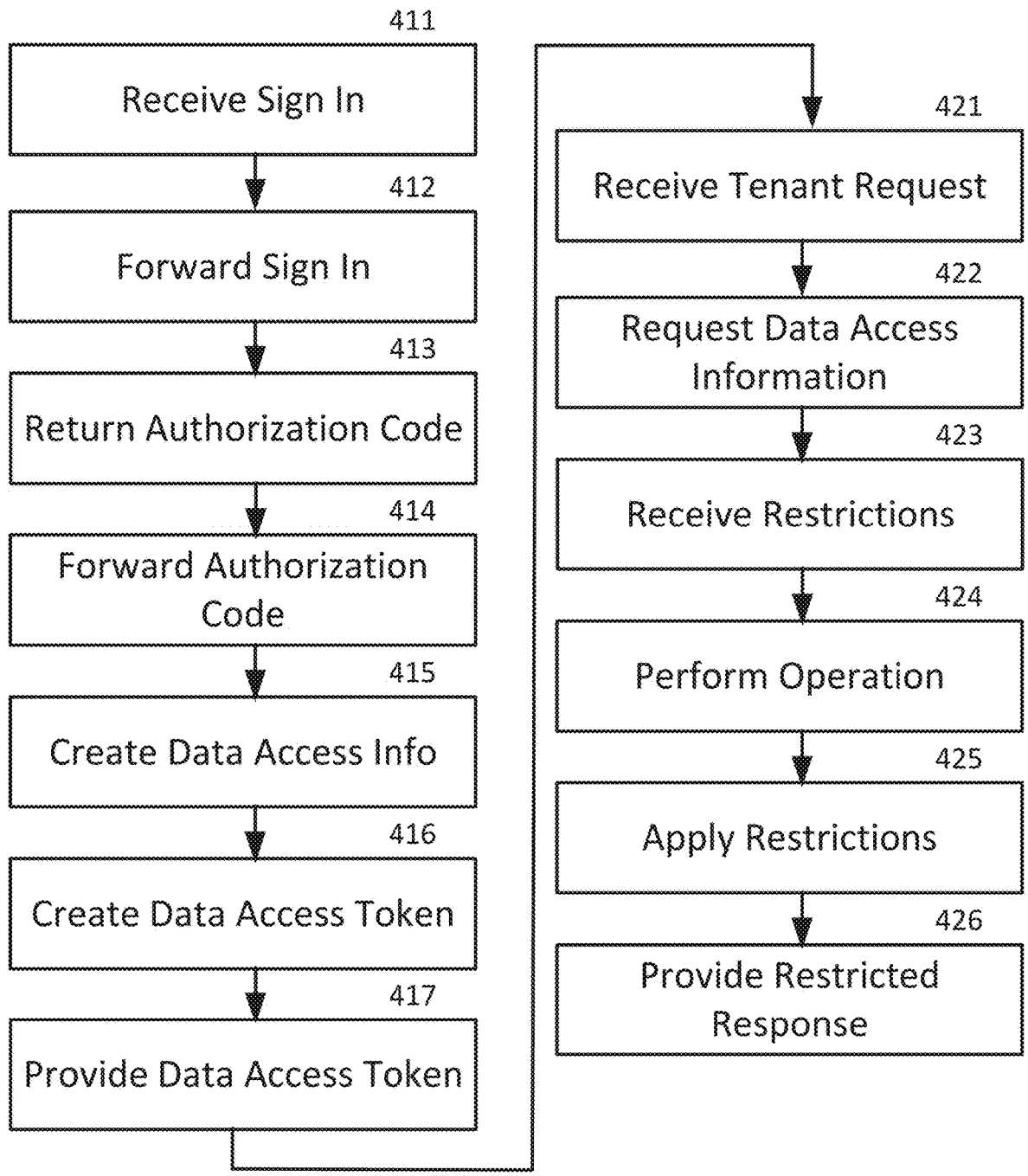
FIG. 4B is a flow chart illustrating an embodiment of a method of operation of an embodiment of a connector system.

FIG. 4A schematically illustrates dataflow between an embodiment of a consumer tenant and an embodiment of a connector system, and data flow within an embodiment of the connector system. FIG. 4B is a flow chart illustrating an embodiment of a method of operation of an embodiment of a connector system. FIG. 4A and FIG. 4B illustrate the operation of a connector system 210 in responding to a request for data from a consumer.

FIG. 4A schematically illustrates a tenant viewer 111 at a tenant's premises, and a core services module 251 and a capability services module 252 as part of an embodiment of a connector system 210. For illustrative purposes, the requesting tenant will be tenant 120.

At step 411, the requesting tenant 120, via tenant viewer 111, sends the tenant's sign in credentials 411 to the cores services module 251 of the connector system 251.

At step 412, the core services module 251 forwards the tenant's sign in credentials to an identity provider 255 that authenticates the tenant's sign in credentials to verify that the tenant 120 is authorized to access the connector system 210. Subject to successful authentication, at step 413 the identity provider 255 then sends an authorization code to the requesting tenant 120 via the tenant's viewer 111.

At step 414, the tenant, via the viewer 111, sends that authentication code to the core services module 251.

In response to receiving the forwarded authentication code, the core services module 251 creates data access information at step 415. The data access information defines what datasets the requesting tenant 120 is allowed to access. The data access information is based on the sharing rules defined, by the contributor of each such dataset, for that specific requesting tenant 120. To that end, the core services module 251 is in data communication with the sharing rules data store 212. In some embodiments, the sharing rules data store 212 is part of the core services module 251.

Subsequently, at step 416, the core services module 251 creates an access token and at step 417 forward the access token to the requesting tenant 120.

In order to initiate obtaining access to one or more datasets held by the connector system 210, the requesting tenant 120 sends a request to the capability service module 252 of the connector system 210, and the capability services module receives that request, all at step 421. The request may be referred-to as an "operation" in that it requests the connector system 210 to execute steps to provide one or more datasets to the requesting tenant. The request includes the access token.

In response to receipt of the operation (and the access token), at step 422 the capability service module 252 requests data access information from the core services module 251. At step 423, the core services module 251 responds by sending restrictions identifying limitations, if any, on the provision by the connection system 210 to the requesting tenant 120 of a requested dataset, and the capability service module 252 receives those restriction identifying limitations.

Upon receipt of the restrictions, the capability services module 252 performs operations at step 424 to prepare a response to the request from the requesting tenant 120. Such operations may include, for example, retrieving a dataset from the module service in which the dataset is stored. In some embodiments, a dataset (e.g., a first dataset) has a first format, and producing restricted data (first restricted data) includes reformatting the first dataset into a later or restricted version of the first format. In some embodiments, the first dataset has a first format, and producing first restricted data comprises reformatting the first dataset into a second format, the second format distinct from the first format.

At step 425, the capability services module 252 applies restrictions to the dataset, pursuant to the sharing rules, to produce a "restricted response." In some embodiments, for example, step 425 may include redacting certain information from the dataset. This may be desirable, for example, when the dataset includes information that the contributor of the dataset does not want to share with the requesting tenant. As a non-limiting illustration, a dataset may include personally identifiable information about a witness to an event or a victim of a crime, and the contributor may desire to not disclose that personally identifiable information to the requesting tenant 120. In such a scenario, the sharing rules from the contributor of the dataset ma specify that the personally identifiable information from the dataset must not be shared with the requesting tenant 120, and so at step 425 the capability service module 252 redacts (e.g., removes or makes illegible) that personally identifiable information from the dataset.

Subsequently, at step 426, the capability services module 252 sends, or otherwise provides access to, the restricted response to the requesting tenant 120.

Figure 1B:
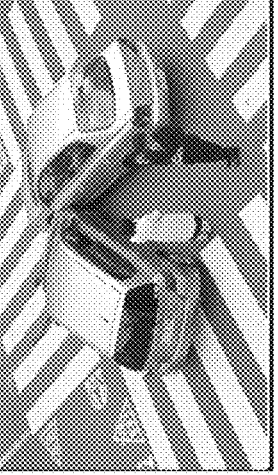
FIG. 1B schematically illustrates an embodiment of a consumer's user interface displaying a plurality of datasets obtained by the consumer from a connector system, all datasets relating to the same incident.

Upon receipt of one or more restricted data responses, the tenant's user interface at the consumer 120 may display the restricted data responses. For example, FIG. 1B schematically illustrates an embodiment of a consumer's user interface 150 displaying a plurality of datasets obtained by the consumer from a connector system, all datasets relating to the same incident.

The foregoing descriptions and the figures to which the descriptions refer disclose a computer-implemented system for controllably sharing, with each of a set consumer tenants, data provided by each of set of contributor tenants. In various embodiments, the system may be cloud-based, and/or the data sharing may be real-time data sharing.

Illustrative embodiments of such a system include a plurality of business capability modules (for example modules 222; 223; 224; 225; 226 and 227). Each business capability module has an associated subject matter, and a corresponding memory to store datasets having that subject matter. In illustrative embodiments, each dataset stored in a business capability module is stored as a related set of individually identifiable data items (e.g., a set of data strings). For example, a dataset that includes an instance of a person's name would store that person's name data in an individually identifiable data string, so that the dataset may be filtered based on that data string, and/or the person's name may be redacted from response data based on the dataset.

Illustrative embodiments of such a system also include a core services module having a data store to receive and store sharing rules provided by a contributor. Such sharing rules specify how each dataset provided by that contributor may be shared with each consumer in a set of consumers.

Illustrative embodiments of such a system also includes a capability service module. The capability service module is configured (i) to receive, from a consumer (the requesting tenant), a request to provide, from the system to the requesting tenant, a requested dataset; (ii) to request and receive data access information from the core services module, the data access information defining, based on sharing rules provided by a contributor of the requested dataset, how the requested dataset can be shared with the requesting tenant; (iii) to produce restricted response data pursuant to the data access information; and (iv) provide the restricted response data to the requesting tenant.

A listing of certain reference numbers is presented below.
- 100: Organization;
- 110: First tenant;
- 111: Tenant UI viewer;
- 112: Set of data generator devices;
- 113: First dataset generator;
- 114: Second dataset generator;
- 115: Connect gateway or (or "field gateway");
- 119: Communications interface;
- 120: Second tenant;
- 130: Third tenant;
- 140: Fourth tenant;
- 210: Connection system;
- 211: User interface application (or UI APP);
- 212: Sharing rules data store;
- 219: System bus;
- 221: Gateway portal;
- 222: Alarms service module;
- 223: Incident service module;
- 224: Units service module;
- 225: Video service module;
- 226: Devices service module;
- 227: Asset service module;
- 251: Core services module (may also be referred to as "Common" services module);
- 252: Business capabilities module;
- 253: Capability services module;
- 255: Identity provider.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A cloud-based computer-implemented system for controllably sharing, with each of a set consumer tenants, real-time data provided by each of set of contributor tenants, the system comprising: a plurality of business capability modules, each business capability module having an associated subject matter, and having a corresponding memory to store datasets having that subject matter; a core services module having a data store to receive and store sharing rules provided by a contributor to specify how each dataset may be shared with a set of consumers; and a capability service module the capability service module configured: (i) to receive, from a consumer (the requesting tenant), a request to provide, from the system to the requesting tenant, a requested dataset; (ii) to request and receive data access information from the core services module, the data access information defining, based on sharing rules provided by a contributor of the requested dataset, how the requested dataset can be shared with the requesting tenant; (iii) to produce restricted response data pursuant to the data access information; and (iv) provide the restricted response data to the requesting tenant.

P2: The system of P1, further comprising: a gateway portal configured in data communication with the capability service module to receive, from a plurality of contributors, a plurality of datasets, each dataset having a corresponding subject matter; and a user interface in data communication with the core services module to receive, from a corresponding operator of each contributor of the plurality of contributors, and provide to the core services module: (a) designation of one or more datasets to be contributed by the contributor; and (b) a definition of sharing rules individually corresponding to each dataset.

P3: The system of P2, wherein the user interface is also in data communication with the capability service module to receive, and provide to the capability service module, a request from a requesting tenant to provide, from the system to the requesting tenant, a requested dataset.

P4: The system of any of P1-P3, wherein: the sharing rules provided by a contributor specify how each dataset provided by that contributor may be shared with other tenants includes rules limiting which other tenants may view the dataset; and wherein the capability service module is configured to decline a request for a requested dataset, from a requesting tenant, which requesting tenant is not authorized by corresponding sharing rules to view the requested dataset.

P5. The system of P1-P4, wherein: the sharing rules provided by a contributor to specify how each dataset may be shared with other tenants includes rules limiting the restricted response data to a redacted dataset; and wherein the capability service module is configured to produce, as the restricted response data, said redacted dataset.

It should be noted that various systems, their components and modules may be implemented in electronic circuits, programmable (and programmed) computer processor circuits executing executable code, or combinations of such electronic circuits and programmable (and programmed) computer processor circuits.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A cloud-based computer-implemented system for controllably sharing, with each of a set consumer tenants, real-time data relating to an event, the real-time data comprising a plurality of datasets including a first dataset from a first dataset generator, the first dataset having a first subject matter, and a second dataset from a second dataset generator, the second dataset having a second subject matter distinct from the first subject matter, each such dataset provided by a corresponding contributor of a set of contributor tenants, the system comprising:

a gateway portal configured to receive the first dataset from the first dataset generator along with metadata identifying the subject matter of the first dataset, and the second dataset from the second dataset generator along with metadata identifying the subject matter of the second dataset, the gateway portal configured to distribute the first dataset and the second dataset to a first business capability module and a second business capability module based on their respective subject matters;

wherein the first business capability module is associated with the event and has a first memory to store only datasets having the first subject matter;

wherein the second business capability module is associated with the event and has a second memory to store only datasets having the second subject matter, such that the first dataset and the second dataset segregated into memories by their respective subject matters;

a core services module having a data store to receive and store sharing rules provided by a corresponding contributor to specify how each of the first dataset and the second dataset may be shared with a set of consumers; and a capability service module, the capability service module configured:

(i) to receive, from a consumer (a requesting tenant), a request to provide, from the system to the requesting tenant, a requested dataset;

(ii) to request and receive data access information from the core services module, the data access information defining, based on sharing rules provided by a contributor of the requested dataset, how the requested dataset can be shared with the requesting tenant;

(iii) to produce a restricted response data pursuant to the data access information; and (iv) to provide the restricted response data to the requesting tenant.

2. The system of claim 1, further comprising:

a user interface in data communication with the core services module to receive, from a corresponding operator of each contributor of the plurality of contributors, and to provide to the core services module:

(a) designation of one or more datasets to be contributed by the contributor; and (b) a definition of sharing rules individually corresponding to each dataset to be contributed by the contributor.

3. The system of claim 2, wherein the user interface is also in data communication with the capability service module to receive, and provide to the capability service module, a request from a requesting tenant to provide, from the system to the requesting tenant, a requested dataset.

4. The system of claim 1, wherein:

the sharing rules provided by a contributor specify how each dataset provided by that contributor may be shared with other tenants include rules limiting which other tenants may view the dataset; and wherein the capability service module is configured to decline a request for a requested dataset, from a requesting tenant, which requesting tenant is not authorized by corresponding sharing rules to view the requested dataset.

5. The system of claim 1, wherein:

the sharing rules provided by a contributor to specify how each dataset may be shared include rules limiting the restricted response data to a redacted dataset; and wherein the capability service module is configured to produce, as the restricted response data, said redacted dataset.

6. A computer-implemented system for controllably sharing, with each of a plurality of affiliated tenants, real-time data relating to an event, the data comprising a plurality of datasets including a first dataset provided by a first contributor, the first dataset having a first subject matter, and a second dataset provided by a second contributor, the second dataset having a second subject matter distinct from the first subject matter, the system comprising:

a cluster of connect system components remote from, and in data communication with, each of the first contributor and the second contributor, the cluster comprising:

a gateway portal configured to receive the first dataset from the first contributor and the second dataset from the second contributor, the gateway portal configured to distribute the first dataset and the second dataset to a first business capability module and a second business capability module based on their respective subject matters;

the first business capability module associated with the event and having a first memory to store only datasets having the first subject matter;

the second business capability module associated with the event and having a second memory to store only datasets having the second subject matter;

a core services module having a data store to receive and store sharing rules provided by the first contributor and the second contributor to specify, respectively, how the first dataset and the second dataset may be shared with a set of consumers; and a capability service module the capability service module configured:

(i) to receive, from a requesting tenant, a request to provide, from the system to the requesting tenant, a requested dataset selected from the first dataset and the second dataset;

(ii) to request and receive data access information from the core services module, the data access information defining, based on sharing rules provided by a contributor of the requested dataset, how the requested dataset can be shared with the requesting tenant;

(iii) to produce restricted response data pursuant to the data access information; and (iv) provide the restricted response data to the requesting tenant.

7. The computer-implemented system of claim 6, wherein the cluster further comprises:

a user interface in data communication with the core services module to receive from a corresponding operator of each contributor and provide to the core services module:

(a) designation of one or more datasets to be contributed by the contributor; and (b) a definition of sharing rules individually corresponding to each dataset.

8. The computer-implemented system of claim 7, wherein the user interface is also in data communication with the capability service module to receive, and provide to the capability service module, a request from the requesting tenant to provide, from the system to the requesting tenant, a requested dataset.

9. The system of claim 6, wherein:

the sharing rules provided by a contributor specify how each dataset provided by that contributor may be shared with other tenants includes rules limiting which other tenants may view the dataset; and wherein the capability service module is configured to decline a request for a requested dataset, from a requesting tenant, which requesting tenant is not authorized by corresponding sharing rules to view the requested dataset.

10. The system of claim 6, wherein:

the sharing rules provided by a contributor to specify how each dataset may be shared with other tenants includes rules limiting the restricted response data to a redacted dataset; and wherein the capability service module is configured to produce, as the restricted response data, said redacted dataset.

11. The system of claim 7, wherein the first contributor comprises:

a gateway in data communication with the gateway portal in the cluster, the gateway and gateway portal configured to communicate the first dataset from the first contributor to the cluster.

12. The system of claim 11, wherein the first contributor comprises a tenant, and said tenant comprises:

a contributor viewer in data communication with the cluster user interface to communicate, to the capability service module:

(i) sharing rules provided by the tenant in its capacity as a contributor; and (ii) a request to provide, from the system to the tenant, as a requesting tenant, a requested dataset.

13. A method of exchanging data relating to an event, the data comprising a plurality of datasets relating to the event, the datasets including a first dataset from a first contributor from among a plurality of tenants, the first dataset having a first subject matter, and a second dataset from a second contributor from among the plurality of tenants, the second dataset having a second subject matter distinct from the first subject matter, and each dataset of the plurality of datasets also having an associated subject matter selected from a corresponding plurality of subject matters, each such dataset provided by a corresponding contributor among a plurality of tenants, the method comprising:

providing a cluster remote from, and in data communication with, each of a first contributor and a consumer, the cluster comprising:

a gateway portal configured to receive the first dataset from the first contributor and the second dataset from the second contributor, the gateway portal configured to distribute the first dataset and the second dataset to a first business capability module and a second business capability module based on their respective subject matters;

a plurality of business capability modules associated with the event, including a first business capability module associated with the event and having a first memory to store only datasets having the first subject matter;

a second business capability module associated with the event and having a second memory to store only datasets having the second subject matter, such that the first dataset and the second dataset are segregated into memories by their respective subject matters;

receiving the first dataset from the first contributor and storing said first dataset in said first memory;

receiving the second dataset from the second contributor, and storing said second dataset in said second memory;

providing a core services module having a data store to receive and store sharing rules provided by a contributor to specify how each dataset may be shared with the consumer; and providing a capability service module, the capability service module configured:
(i) to receive, from a requesting tenant, a request to provide, from the system to the requesting tenant, a requested dataset from among the first dataset and the second dataset;
(ii) to request and receive data access information from the core services module, the data access information defining, based on sharing rules provided by a contributor of the requested dataset, how the requested dataset can be shared with the requesting tenant;
(iii) to produce restricted response data pursuant to the data access information; and
(iv) provide the restricted response data to the requesting tenant;

receiving, from the first contributor:
a first set of data sharing rules corresponding to the first dataset; and
storing the first set of data sharing rules in the core services module; and
producing, from the first dataset, first restricted data; and
providing to the requesting tenant, in response to a request from the requesting tenant, the restricted dataset.

14. The method of claim 13, wherein the producing first restricted data comprises redacting a subset of data from the first dataset.

15. The method of claim 13, wherein the first dataset has a first format, and producing first restricted data comprises reformatting the first dataset into a later version of the first format.

16. The method of claim 13, wherein the first dataset has a first format, and producing first restricted data comprises reformatting the first dataset into a second format, the second format distinct from the first format.

17. A computer-implemented system for controllably sharing, with each consumer tenant of a set of consumer tenants, data provided by each contributor tenant of set of contributor tenants, the data relating to an event, the data comprising a first dataset from a first contributor tenant, the first dataset having a first subject matter, and a second dataset from a second contributor tenant, the second dataset having a second subject matter distinct from the first subject matter, the system comprising:

a means for receiving the first dataset from the first contributor tenant and the second dataset from the second contributor tenant, said means configured to distribute the first dataset and the second dataset to a first business capability means and a second business capability means based on their respective subject matters;

the first business capability means associated with the event and having a first memory for storing only datasets having the first subject matter;

the second business capability means associated with the event and having a second memory for storing only datasets having the second subject matter, a plurality of business capability means associated with the event, for receiving and storing datasets, each business capability means having an associated subject matter selected from the corresponding plurality of subject matters, and having a corresponding memory means for storing only datasets having that associated subject matter such that the first dataset and the second dataset are segregated into the first memory and the second memory, respectively, according to respective subject matters;

a core services means having a data store for receiving and storing sharing rules provided by a contributor to specify how each dataset may be shared with a set of consumers; and a capability service means for:
(i) receiving, from a requesting tenant, a request to provide, from the system to the requesting tenant, a requested dataset;
(ii) requesting and receiving data access information from the core services module, the data access information defining, based on sharing rules provided by a contributor of the requested dataset, how the requested dataset can be shared with the requesting tenant;
(iii) producing restricted response data pursuant to the data access information; and
(iv) providing the restricted response data to the requesting tenant.

18. The system of claim 17, further comprising:
a user interface means for receiving, from a corresponding operator of each contributor of the plurality of contributors and providing to the core services module:
(a) designation of one or more datasets to be contributed by the contributor; and
(b) a definition of sharing rules individually corresponding to each dataset.

19. The system of claim 17, wherein the user interface means is in data communication with the capability service module to receive, and is configured to provide to the capability service module, a request from a requesting tenant to provide, from the system to the requesting tenant, a requested dataset.

20. The system of claim 17, wherein:
the sharing rules provided by a contributor that specify how each dataset provided by that contributor may be shared include rules limiting which other tenants may view the dataset; and wherein
the capability service means is configured to decline a request for a requested dataset, from a requesting tenant, which requesting tenant is not authorized by corresponding sharing rules to view the requested dataset.

* * * * *